US 7,849,440 B1

(12) United States Patent
Englehart

(10) Patent No.: US 7,849,440 B1
(45) Date of Patent: *Dec. 7, 2010

(54) REAL-TIME CODE PREVIEW FOR A MODEL BASED DEVELOPMENT PROCESS

(75) Inventor: Matthew Englehart, Olmstead Falls, OH (US)

(73) Assignee: The MathWorks, Inc., Natick, MA (US)

( * ) Notice: Subject to any disclaimer, the term of this patent is extended or adjusted under 35 U.S.C. 154(b) by 1065 days.

This patent is subject to a terminal disclaimer.

(21) Appl. No.: 10/826,599

(22) Filed: Apr. 16, 2004

(51) Int. Cl.
*G06F 9/44* (2006.01)
*G06F 3/00* (2006.01)
*G06F 3/048* (2006.01)

(52) U.S. Cl. .................. 717/106; 717/104; 717/105; 717/109; 717/110; 717/111; 717/113; 717/135; 715/762; 715/763; 715/764; 715/771

(58) Field of Classification Search .............. 717/106, 717/109, 126, 173, 102, 105, 108, 111; 709/203; 370/255; 716/7; 345/771
See application file for complete search history.

(56) References Cited

U.S. PATENT DOCUMENTS

| | | | | |
|---|---|---|---|---|
| 6,175,948 B1 * | 1/2001 | Miller et al. ............... 716/7 |
| 6,266,809 B1 * | 7/2001 | Craig et al. ................ 717/173 |
| 6,851,107 B1 * | 2/2005 | Coad et al. ................ 717/108 |
| 6,886,029 B1 * | 4/2005 | Pecus et al. ............... 709/203 |
| 7,031,267 B2 * | 4/2006 | Krumel ...................... 370/255 |
| 7,069,542 B2 * | 6/2006 | Daly ........................... 717/126 |
| 7,086,046 B2 * | 8/2006 | Barsness et al. ............. 717/152 |
| 7,134,090 B2 * | 11/2006 | Kodosky et al. ............ 715/769 |
| 7,197,739 B2 * | 3/2007 | Preston et al. .............. 717/106 |
| 7,367,028 B2 * | 4/2008 | Kodosky et al. ............ 717/177 |
| 7,412,658 B2 * | 8/2008 | Gilboa ....................... 715/762 |
| 2002/0138820 A1 * | 9/2002 | Daly .......................... 717/126 |
| 2002/0191023 A1 * | 12/2002 | Chandhoke et al. ........ 345/771 |
| 2002/0196285 A1 * | 12/2002 | Sojoodi et al. ............. 345/771 |
| 2003/0037322 A1 * | 2/2003 | Kodosky et al. ............ 717/162 |
| 2003/0184595 A1 * | 10/2003 | Kodosky et al. ............ 345/810 |
| 2003/0184596 A1 * | 10/2003 | Kodosky et al. ............ 345/810 |
| 2003/0193522 A1 * | 10/2003 | Chandhoke ................. 345/764 |
| 2003/0196187 A1 * | 10/2003 | Kodosky et al. ............ 717/109 |
| 2003/0227482 A1 * | 12/2003 | Bach et al. .................. 345/762 |
| 2003/0231211 A1 * | 12/2003 | Shah et al. .................. 345/771 |
| 2004/0034846 A1 * | 2/2004 | Ortal et al. ................. 717/111 |
| 2004/0090458 A1 * | 5/2004 | Yu et al. ..................... 345/760 |
| 2004/0148586 A1 * | 7/2004 | Gilboa ....................... 717/108 |
| 2004/0158812 A1 * | 8/2004 | Dye et al. ................... 717/105 |
| 2005/0005258 A1 * | 1/2005 | Bhogal et al. .............. 717/102 |
| 2005/0114832 A1 * | 5/2005 | Manu ......................... 717/106 |
| 2005/0193343 A1 * | 9/2005 | Kawabe et al. ............. 715/716 |

* cited by examiner

*Primary Examiner*—Insun Kang
(74) *Attorney, Agent, or Firm*—Nelson Mullins Riley & Scarborough LLP; Kevin J. Canning; Neslihan I. Doran

(57) ABSTRACT

In a graphical modeling environment, a preview of code generated in response to a selected component in a graphical model is presented using a graphical user interface. The code preview provides feedback to a user regarding the impact of the settings for the selected component, allowing the user to observe the effect of certain settings before generating code for the entire graphical model. The code preview may be presented through the same graphical user interface used to select the settings for the component, or a separate graphical user interface.

19 Claims, 17 Drawing Sheets

REAL-TIME CODE PREVIEW FOR A MODEL BASED DEVELOPMENT PROCESS

FIELD OF THE INVENTION

The present invention relates to a graphical modeling environment for modeling a dynamic system. More particularly, the present invention relates to code generation in a graphical modeling application.

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically consists of automatically generating code for portions of the model, particularly portions corresponding to the system's control algorithm.

Graphical modeling environments are an example of software applications that may enable a user to model, simulate, and analyze dynamic systems i.e., systems whose outputs change over time, using a graphical model, such as a block diagram. Simulating a dynamic system in a graphical modeling environment is typically a two-step process. First, a user creates a graphical model, such as a block diagram, of the system to be simulated. A graphical model may be created using a graphical user interface, such as a graphical model editor. The graphical model depicts time-based relationships between the systems inputs, states, parameters and outputs. After creation of the graphical model, the behavior of the dynamic system over a specified time period is simulated using the information entered into the graphical model. In this step, the graphical model is used to compute and trace the temporal evolution of the dynamic systems' outputs ("execute the graphical model"), and automatically produce either deployable software systems or descriptions of hardware systems that mimic the behavior of either the entire model or portions of the model (code generation).

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, which are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are assumed to have values at each time instant. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination nodes of this signal read from the signal when their system equations are being solved. Those skilled in the art will recognize that the term "nodes" does not refer exclusively to elemental dynamic systems but may also include other modeling elements that aid in readability and modularity of block diagrams.

Automatic code generation is a process whereby software source code is automatically produced from a model of a system, such as a block diagram. For example, in some environments, automatic code generators transform hierarchical block diagrams into software. The software source code produced by the automatic code generation process may be compiled and then executed on a digital computer, implementing the functionality specified by the model. The hierarchy of the model maps to the functional call graph of the generated code. It is desirable for users of automatic code generators to control the signatures of the produced functions in the generated code.

It is often the case that the implementation of a model, i.e., the code generated, is affected by settings associated with the objects and components of the model. For example, one might configure settings of some objects to affect data declarations and definitions. Another setting might exercise a time-space tradeoff in the generated code. These settings are typically chosen and exercised through graphical user interfaces provided within the graphical modeling environment. Another collection of component settings might affect the form of the function signatures created.

A drawback to current systems is that the affect of the settings on the code generated for the model is not immediately obvious to the users from the model. For example, the necessary arguments to the functions are generally not immediately obvious to the user from the model. Typically, many arguments are artifacts resulting from implementing an object-oriented design specification (e.g. functional units with internal states) with a procedural language (e.g. C or Ada). For example, many arguments are unexpected because the arguments do not map directly to the input and output ports of the subsystem or model to which the function corresponds. Another drawback in current environments is that it can be cumbersome to maintain a literal specification of the function signatures as elements of the model are added and deleted, which changes the exact number and types of function arguments.

In addition, generation of code for a model can consume significant time, and it is not always possible to generate code for a partially specified model. Therefore, if a tool user wishes to observe the impact of the settings chosen through inspection of the generated code, it is often necessary to construct and generate code for the entire model. Then, the user can review the generated code, change one or more of the settings if the impact is not what is desired, and generate the code again for the entire modified model. Such a process is time-consuming, inefficient and at times impossible.

SUMMARY OF THE INVENTION

The present invention provides a preview of aspects of the code generated in response to component and object settings chosen by the user for a graphical model in a graphical modeling environment. The code preview generated in response to a selected component or object in a graphical model is presented using a graphical user interface. The code preview provides feedback to a user regarding the impact of the settings for the selected component, allowing the user to observe the effect of certain settings before generating code for the entire graphical model. The code preview may be presented through the same graphical user interface used to select the settings for the component, or a separate graphical user interface. The code preview may be automatically updated when a user changes a setting, to reflect the impact of the change in the generated code.

According to one aspect, the present invention provides a method, and a medium holding computer-executable instructions for the method. The method comprises the steps of a user defining a property for a component of a graphical model, generating code representative of the component of the block diagram and displaying the generated code on a graphical user interface.

According to another aspect, the present invention provides a method, and a medium holding computer-executable instructions for the method. The method comprises the steps of a user altering a setting of a component of a graphical model, automatically updating code representative of the setting in response to the user altering the setting and displaying the updated code on a graphical user interface.

According to another aspect, a system for generating and displaying a graphical programming application is provided. The system comprises user-operable input means for inputting data to the graphical programming application, a display device for displaying a graphical model and an electronic device including memory for storing computer program instructions and data, and a processor for executing the stored computer program instructions. The computer program instructions include instructions for providing a code preview to a user on the display device. The code preview displays code representative of a component of the block diagram after the user defines a property of the component using the user-operable input means.

According to another aspect, a system for generating and displaying a graphical programming application is provided. The system comprises user-operable input means for inputting data to the graphical programming application, a display device for displaying a graphical model and an electronic device including memory for storing computer program instructions and data, and a processor for executing the stored computer program instructions. The computer program instructions include instructions for automatically updating code representative of a setting for a component in the graphical model in response to the user altering the setting; and displaying the updated code.

DETAILED DESCRIPTION OF AN ILLUSTRATIVE EMBODIMENT

An illustrative embodiment of the present invention relates to a user interface for specifying parameters of an object or component in a model within a model in a graphical modeling environment. A user interface further provides a real time code preview of aspects of code generated in response to the object and/or component settings selected by the user. The user interface that provides the code preview may be the same interface used to select the parameters of the object and/or component. The present invention will be described relative to illustrative embodiments. Those skilled in the art will appreciate that the present invention may be implemented in a number of different applications and embodiments and is not specifically limited in its application to the particular embodiments depicted herein.

Figure 1A:
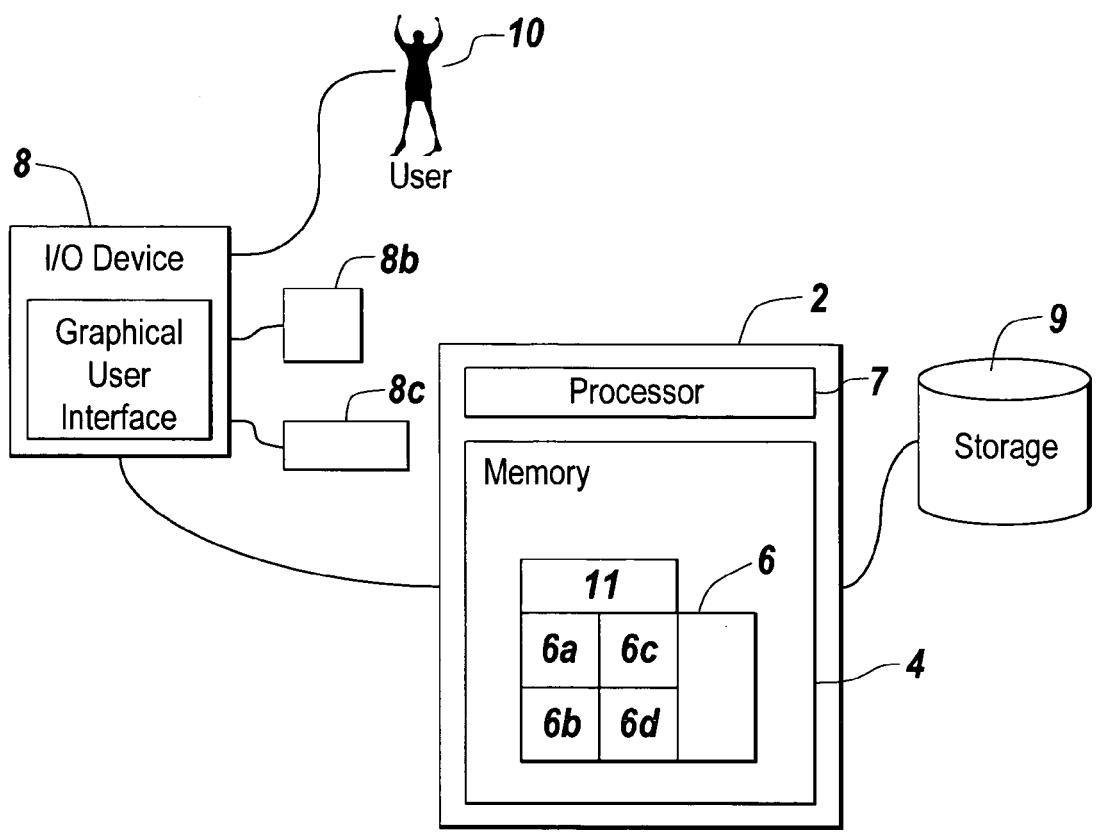
FIG. 1A illustrates an environment suitable for practicing an illustrative embodiment of the present invention.

FIG. 1A depicts an environment suitable for practicing an illustrative embodiment of the present invention. An electronic device 2 includes memory 4, on which software according to one embodiment of the present invention is stored, a processor (CPU) 7 for executing software stored in the memory, and other programs for controlling system hardware. Typically, the interaction of a human user with the electronic device 2 occurs through an input/output (I/O) device 8, such as a graphical user interface (GUI). The I/O device 8 may include a display device 8a (such as a monitor) and an input device (such as a mouse 8b and a keyboard 8c and other suitable conventional I/O peripherals.

For example, the memory 4 holds a diagramming application 6 capable of creating and simulating electronic versions of system diagrams, such as block diagrams, state diagrams, signal diagrams, flow chart diagrams, sequence diagrams, UML diagrams, dataflow diagrams, circuit diagrams, ladder logic diagrams, kinematic element diagrams, or other models, which may be displayed to a user 10 via the display device 8*a*. In the illustrative embodiment, the diagramming application 6 comprises a block diagram environment, such as Simulink® or another suitable other graphical modeling environment. As used herein, the terms "block diagram environment" and "graphical modeling environment" refer to a graphical application where a model is translated into executable instructions. Examples of suitable diagramming applications include, but are not limited to MATLAB, version 6.1 with SIMULINK, version 5.0 from the MathWorks, LABVIEW, DASYLAB and DIADEM from National Instruments Corporation, VEE from Agilent, SoftWIRE from Measurement Computing, VisSim from Visual Solutions, SYSTEMVIEW from Elanix, WiT from Coreco, Vision Program Manager from PPT Vision, Khoros from Khoral Research, and numerous others. The memory 4 may comprise any suitable installation medium, e.g., a CD-ROM, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternate embodiment, the electronic device 2 is also interfaced with a network, such as the Internet. Those skilled in the art will recognize that the diagrams used by the diagramming application 6 may be stored either locally on the electronic device 2 or at a remote location 9 interfaced with the electronic device over a network. Similarly, the diagramming application 6 may be stored on a networked server or a remote peer.

The diagramming application 6 of an illustrative embodiment of the invention includes a number of generic components. Although the discussion contained herein focuses on SIMULINK, version 5.0 (Release 13) from The MathWorks, Inc. of Natick Mass., those skilled in the art will recognize that the invention is applicable to other software applications. The generic components of the illustrative diagramming program 6 include a block diagram editor 6*a* for graphically specifying models of dynamic systems. The block diagram editor 6*a* allows users to perform such actions as construct, edit, display, annotate, save, and print out a graphical model, such as a block diagram, that visually and pictorially represents a dynamic system. The illustrative diagramming application 6 also includes graphical entities 6*b*, such as signal lines and buses that represent how data is communicated between functional and non-functional units, and blocks 6*c*. As noted above, blocks are the fundamental mathematical elements of a classic block diagram model. A block diagram execution engine 6*d*, also implemented in the application, is used to process a graphical model to produce simulation results or to convert the graphical model to executable code. For a block diagram graphical model, the execution engine 6*d* translates a block diagram to executable entities following the layout of the block diagram as provided by the user. The executable entities are compiled and executed on an electronic device, such as a computer, to implement the functionality specified by the model. Typically, the code generation preserves a model hierarchy in a call graph of the generated code. For instance, each subsystem of a model in a block diagram environment can map to a user specified function and the generated code. REAL-TIME WORKSHOP from the MathWorks, Inc. of Natick, Mass. is an example of a suitable execution engine 6*d* for generating code.

In the illustrative embodiment, the diagramming program 6 is implemented as a companion program to a technical computing program 11, such as MATLAB, also available from the MathWorks, Inc.

Figure 1B:
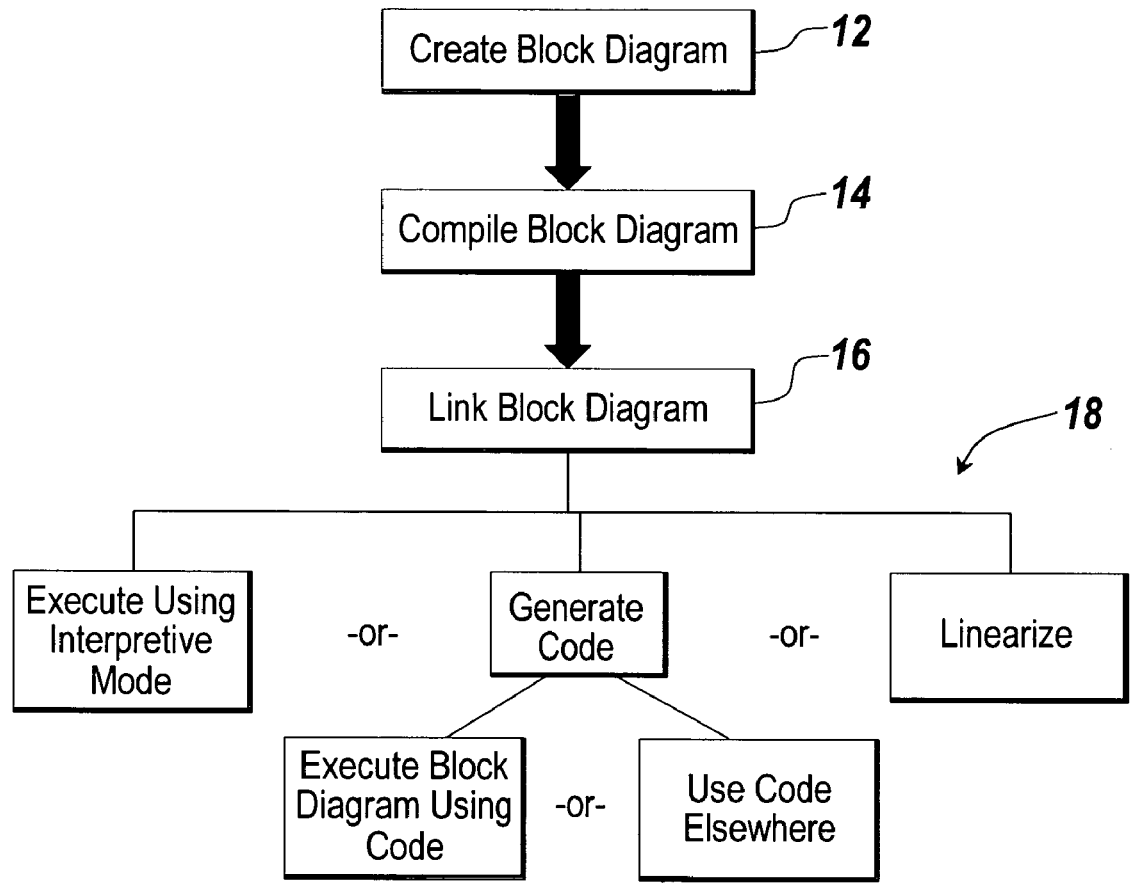
FIG. 1B is a flow chart illustrating the steps involved in simulating a dynamic system using the environment shown in FIG. 1A.

FIG. 1B is a flow chart diagramming the steps involved in simulating a dynamic system according to an illustrative embodiment of the invention. In step 12, a user creates a block diagram model representing a dynamic system. Once a block diagram model, or other graphical model, has been constructed using the editor 6*a* in step 12, the execution engine 6*d* simulates the model by solving equations defined by the model to trace the system outputs as a function of time, in steps 14-18. The solution of the model, which may be referred to as model execution, is carried out over a user-specified time span for a set of user-specified inputs. After creating the block diagram model in step 12, the execution engine 6*d* compiles the block diagram in step 14. Then, in step 16, the execution engine links the block diagram in to produce an "in-memory executable" version of the model. In step 18, the execution engine uses the "in-memory executable" version of the model to generate code in step 22 and/or simulate a block diagram model by executing the model in step 24 or 20, or linearizing a block diagram model in step 30, as described in detail below.

The block diagram editor 6*a* is the graphical user interface (GUI) component that allows a user to create and modify a block diagram model representing a dynamic system, in step 12. The blocks in the electronic block diagram may model the behavior of specialized mechanical, circuit or software components, such as motors, servo-valves, power plants, filters, tires, modems, receivers and other dynamic components. The block diagram editor 6*a* also allows a user to create and store data relating to graphical entities 6*b*. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of GUI tools within the block diagram editor 6*a* allows users to draft a block diagram model on the corresponding windows. For example, in Simulink® the GUI tools include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette on to the window (i.e., model canvas). The graphical version of the block that is rendered on the canvas is called the icon for the block. There may be different embodiments for the block palette including a tree-based browser view of all of the blocks.

Figure 2:
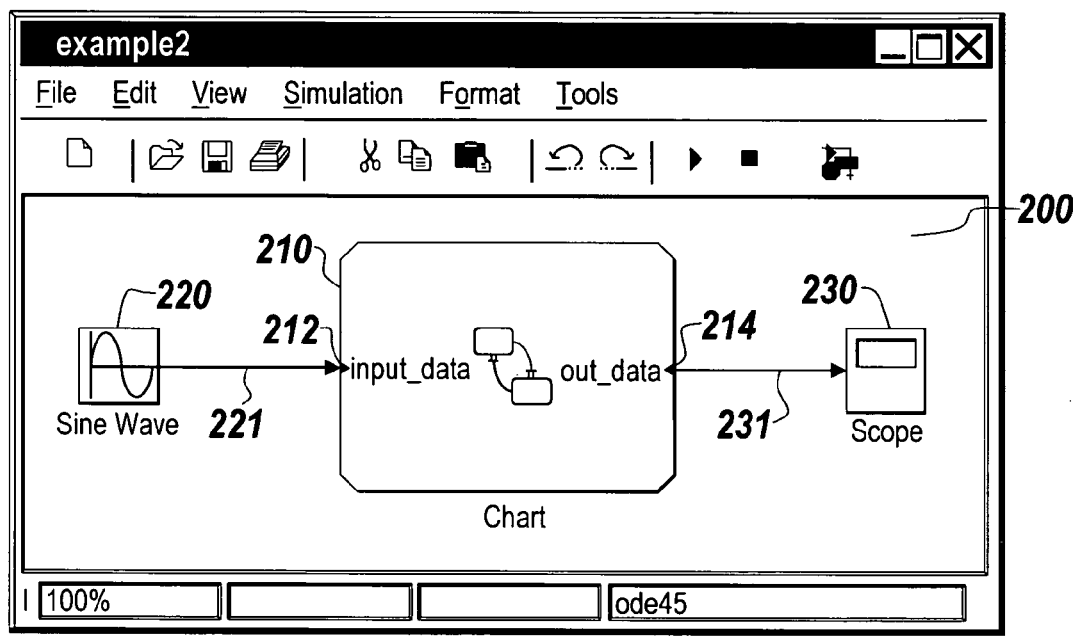
FIG. 2 illustrates a block diagram of a dynamic system in a diagramming application of the prior art.

A block diagram model of a dynamic system, created during step 20, is generally represented schematically as a collection of interconnected graphical objects, such as blocks, ports and lines, which represent signals. FIG. 2 illustrates an example of a block diagram 200 created using the diagramming application 6. Each block in the block diagram 200 represents an elemental dynamic system. Each signal, denoted by lines connecting the blocks, represents the input and output of an elemental dynamic system. The illustrative block diagram 200 also includes a subsystem block 210, a source block 220 and a destination block 230. A line emanating at one block and terminating at another signifies that the output of the first block is an input to the second block. A port, such as an input port 212 and an output port 214 of the subsystem block, refers to a distinct input or output on a block. Signals correspond to the time-varying quantities represented by each line connection and are assumed to have values at each time instant. The source block 220 for a signal 221 writes to the signal at a given time instant when its system equations are solved. In the illustrative embodiment, the source block 220 generates a sine wave. As shown, the signal 221 from the source block passes to the subsystem. The destination block 230 for a signal 231 reads from the signal 231 when the system equation is being solved. In the illustrative embodiment, the designation block 230 is a scope block for outputting or displaying the signal 231 to the user. As shown, the signal 231 represents the output of the subsystem 220. One skilled in the art will recognize that the block diagram 200 is merely illustrative of a typical application and is not intended to limit the present invention in any way.

Once a block diagram model, or other graphical model, has been constructed using the editor 6a in step 12, the execution engine 6d simulates the model by solving equations defined by the model so that the system outputs as a function of time, in steps 14-18. The solution of the model, which may be referred to as model execution, is carried out over a user-specified time span for a set of user-specified inputs.

The compile stage in step 14 marks the start of model execution and involves preparing data structures and evaluating parameters, configuring and propagating block characteristics, determining block connectivity, and performing block reduction and block insertion. The compile stage involves checking the integrity and validity of the block interconnections in the block diagram. In this stage, the engine 6d also sorts the blocks in the block diagram into hierarchical lists that are used when creating the block method execution lists. The preparation of data structures and the evaluation of parameters create and initialize basic data-structures needed in the compile stage. For each of the blocks, a method forces the block to evaluate all of its parameters. This method is called for all blocks in the block diagram. If there are any unresolved parameters, execution errors are thrown at this point.

During the configuration and propagation of block and port/signal characteristics, the compiled attributes (such as dimensions, datatypes, complexity, or sample time) of each block (and/or ports) are setup on the basis of the corresponding functional attributes and the attributes of blocks (and/or ports) that are connected to the given block through lines. The attribute setup is performed through a process during which block functional attributes "ripple through" the block diagram from one block to the next following signal connectivity. This process (referred to herein as "propagation"), serves two purposes. In the case of a block that has explicitly specified its block (or its ports') functional attributes, propagation helps ensure that the attributes of this block are compatible with the attributes of the blocks connected to it. If not, an error is issued. For example, if an Integrator block is implemented to only accept numbers of double precision datatype, then this block will error out if it is driven by a block that produces single precision data, unless the user has asked for an implicit data conversion. Secondly, in many cases blocks are implemented to be compatible with a wide range of attributes. Such blocks adapt their behavior in accordance with the attributes of the blocks connected to them. This is akin to the concept of polymorphism in object-oriented programming languages. For instance, a discrete-time Filter block could be implemented to accept any of the standard integer datatypes ranging from 8-bit to 128-bit. The exact implementation of the block is chosen on the basis of the specific block diagram in which this block finds itself. Included within this step are other aspects such as validating that all rate-transitions within the model yield deterministic results and that the appropriate rate transition blocks are being used.

The compilation step also determines actual block connectivity. Virtual blocks play no semantic role in the execution of a block diagram. During compilation, the virtual blocks and signals, such as virtual bus signals, in the block diagram are optimized away (removed) and the remaining non-virtual blocks are reconnected to each other appropriately. This compiled version of the block diagram with actual block connections is used from this point forward in the execution process Once actual block connectivity has been determined (by removing the virtual blocks) the block diagram may be further optimized by performing block reduction and insertion. During this step, blocks may be inserted or a set of non-virtual blocks may be completely removed or reduced to a single equivalent block. Block insertion and reduction is mainly done to improve execution efficiency.

In the link stage, in step 16, the execution engine 6d uses the result of the compilation stage to allocate memory needed for the execution of the various components of the block diagram. The linking stage also produces block method execution lists, which are used by the simulation or linearization of the block diagram. Included within the link stage is the initialization of the model, which consists of evaluating "setup" methods (e.g. block start, initialize, enable, and constant output methods). The block method execution lists are generated because the simulation and/or linearization of a model must execute block methods by type (not by block) when they have a sample hit.

The compiled and linked version of the block diagram may be directly utilized to execute the model over the desired time-span, in step 18. According to one aspect, after linking has been performed, step 18 comprises the execution engine 6d generating code in step 22 to produce software from the block diagram. In this stage, the execution engine may choose to translate the block diagram model (or portions of it) into either software modules or hardware descriptions (broadly termed code). The code generated by the execution engine could be in a number of possible forms in step 22. The code may be instructions in a high-level software language such as C, C++, Ada, etc., hardware descriptions of the block diagram portions in a language such as HDL, or custom code formats suitable for interpretation in some third-party software. Alternatively, the code may be instructions suitable for a hardware platform such as a microprocessor, microcontroller, or digital signal processor, etc., a platform independent assembly that can be re-targeted to other environments, or just-in-time code (instructions) that corresponds to sections of the block diagram for accelerated performance.

If this stage of generating code is performed, then the stages that follow use the generated code during the execution of the block diagram in step 24. Alternatively, the execution engine skips generating code in step 18 and uses an interpretive mode of execution for the block diagram in step 20. In another embodiment, the execution engine 6d only generates code in step 18. For example, in certain circumstances, a user may not proceed further with the execution of the block diagram after generating code, because he would like to deploy the code outside the confines of the block diagram software, in step 28.

Upon reaching the simulation stage, the execution engine 6d uses a simulation loop to execute block methods in a pre-defined ordering upon a sample hit to produce the system responses they change with time.

To perform a linearization in step 30, SIMULINK uses the block method execution lists in a prescribed fashion to produce a linear state space representation of the dynamic system described by the block diagram.

According to an illustrative embodiment of the invention, the diagramming application 6 allows the user to review aspects of code corresponding to a selected portion or component before the execution engine 6d translates the entire model into code. In an illustrative embodiment, the diagramming application provides a graphical user interface for displaying a code preview to a user representing an implementation of a selected portion or component of a model. The code preview may be presented during construction of a model, without requiring the model to be fully specified. The code preview provides feedback to the user of the form of the code generated for the chosen parameter settings for the selected portion or component of the model. In Simulink® and other diagramming applications, a graphical user interface, such as a dialog box, enables a user to define, specify, edit and/or customize parameters and settings of a graphical object or component of a block diagram. In one embodiment, the code preview may be presented through the same general interface through which the settings for the model are chosen, strengthening the conveyance of a causal relationship between the settings and the generated code. Alternatively, the code preview may be presented through a different interface, for example, a separate graphical user interface specifically configured to display a code preview.

The preview may be automatically updated when a user changes a setting in the model to reflect the change in code resulting from the change in the setting. In one embodiment, the latest changes to the code may be presented in a different format (e.g., font, color) to make it easier to see which portions of the preview are directly affected by the latest choices made.

The preview may be provided in any suitable format or language known to those of ordinary skill in the art, for example, C code. Alternatively, the code presented in the code preview may take the form of tokens or pseudo code, which comprises a symbolic, non-literal representation of the code. A user may select the format of the code in the code preview, which may be different than the format of the code generated by the execution engine 6d after completion of the model.

In one embodiment, the execution engine 6d generates the code for the code preview by generating code for the entire application, presenting portions of the actual code generated for the specified object or component in the code preview field. One skilled in the art will recognize that any suitable mechanism for providing code associated with a specified portion of a model, such as a block, may be used in accordance with the teachings of the invention.

Alternatively, a predictor mechanism implemented in the diagramming application 6 generates the code preview to predict and emulate the code that would be generated for the specified block. Rather than generate code for the entire application using the execution engine 6d and showing relevant snippets of the generated code in the code preview field, the predictor mechanism emulates what the snippets of code would look like if the execution engine 6d were to generate code for the application. The predictor mechanism, which is separate from the execution engine 6d, shows or abstractly represents the code preview. One skilled in the art will recognize that the predictor mechanism may be implemented in any suitable manner and is not limited to any particular mechanism for emulating portions of code for an application.

Figure 3A:
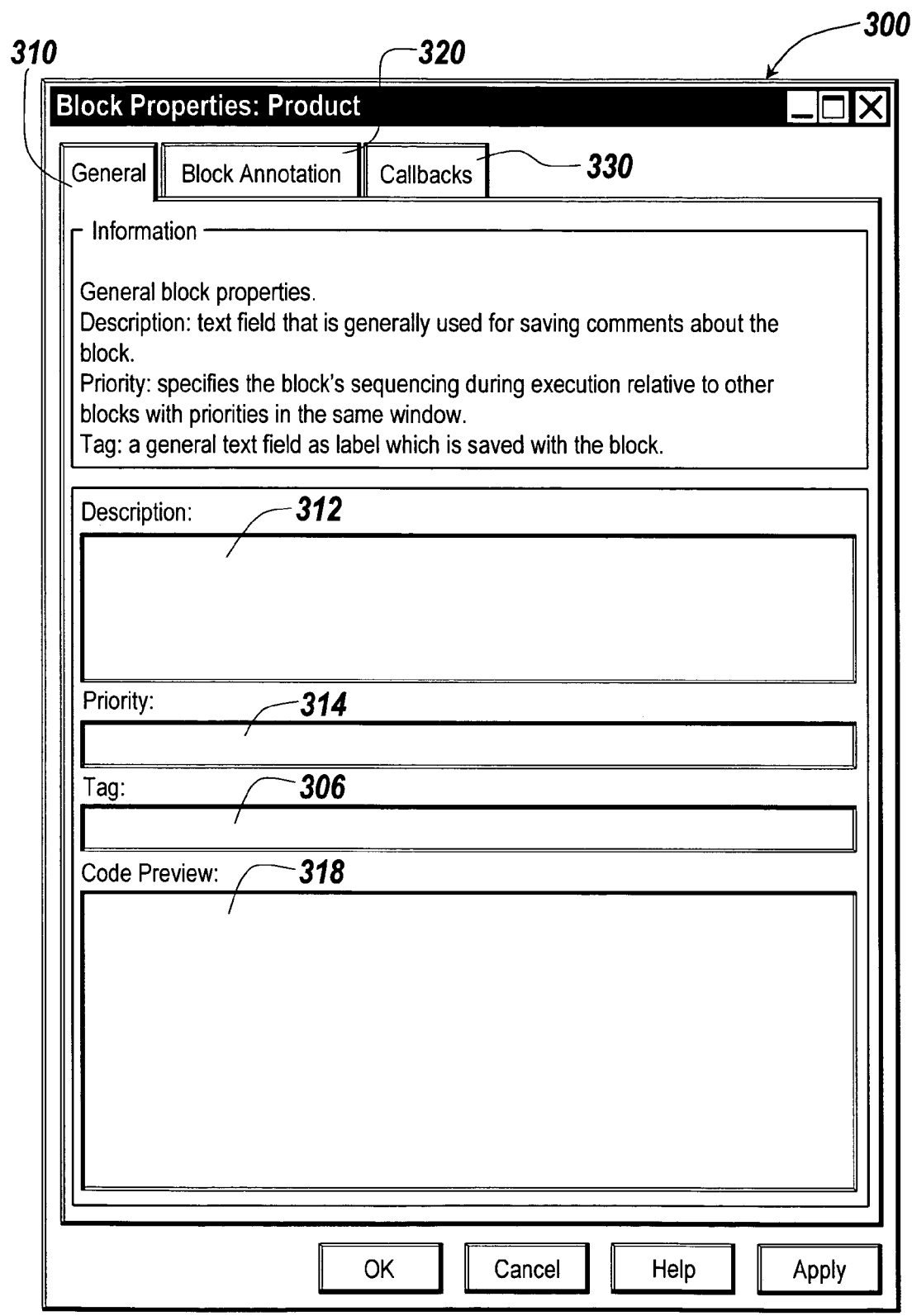
FIGS. 3A-3C illustrate an exemplary graphical user interface for defining properties of a block in a block diagram and displaying a code preview corresponding to the properties, according to an illustrative embodiment of the invention.
Figure 3B:
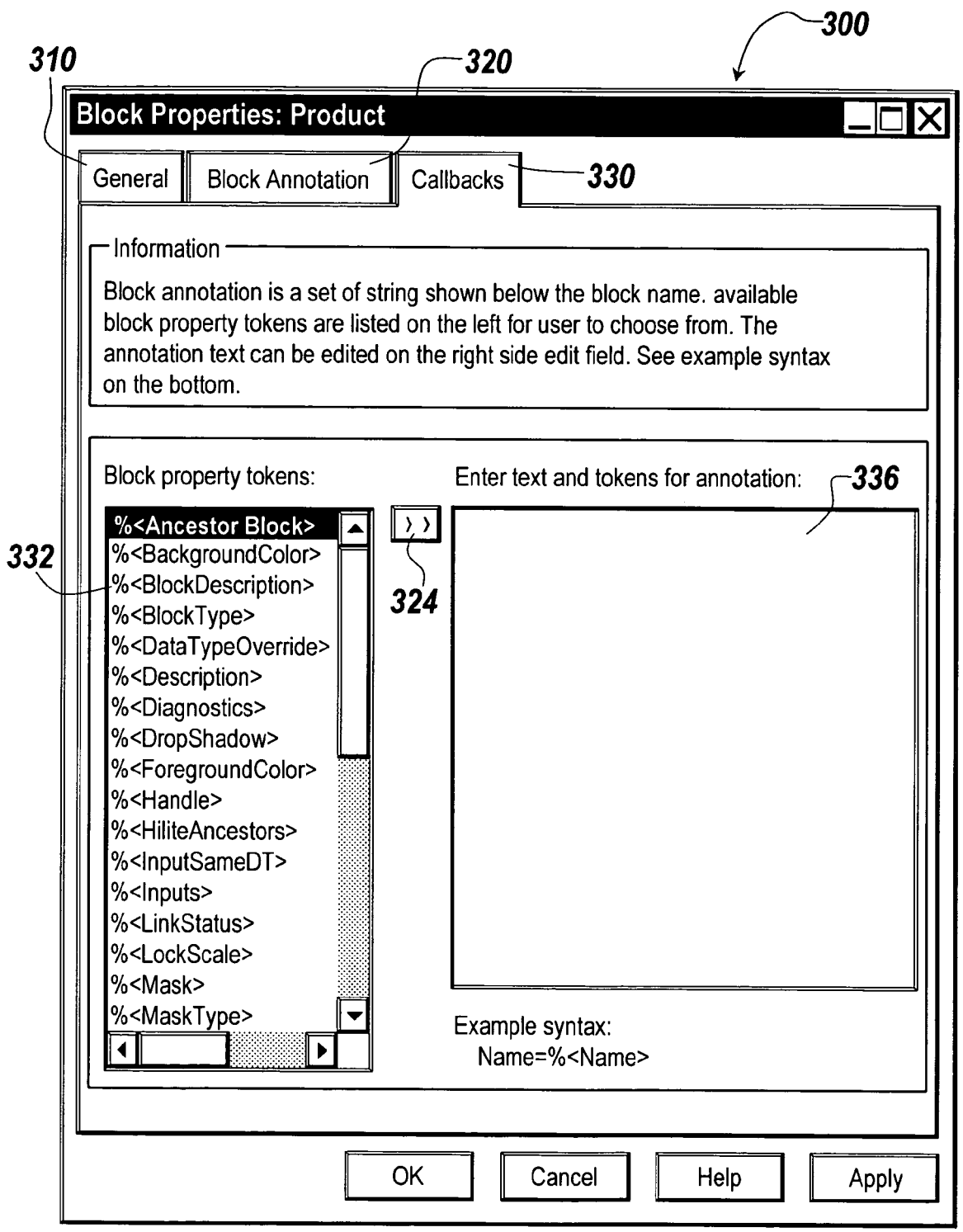
Figure 3C:
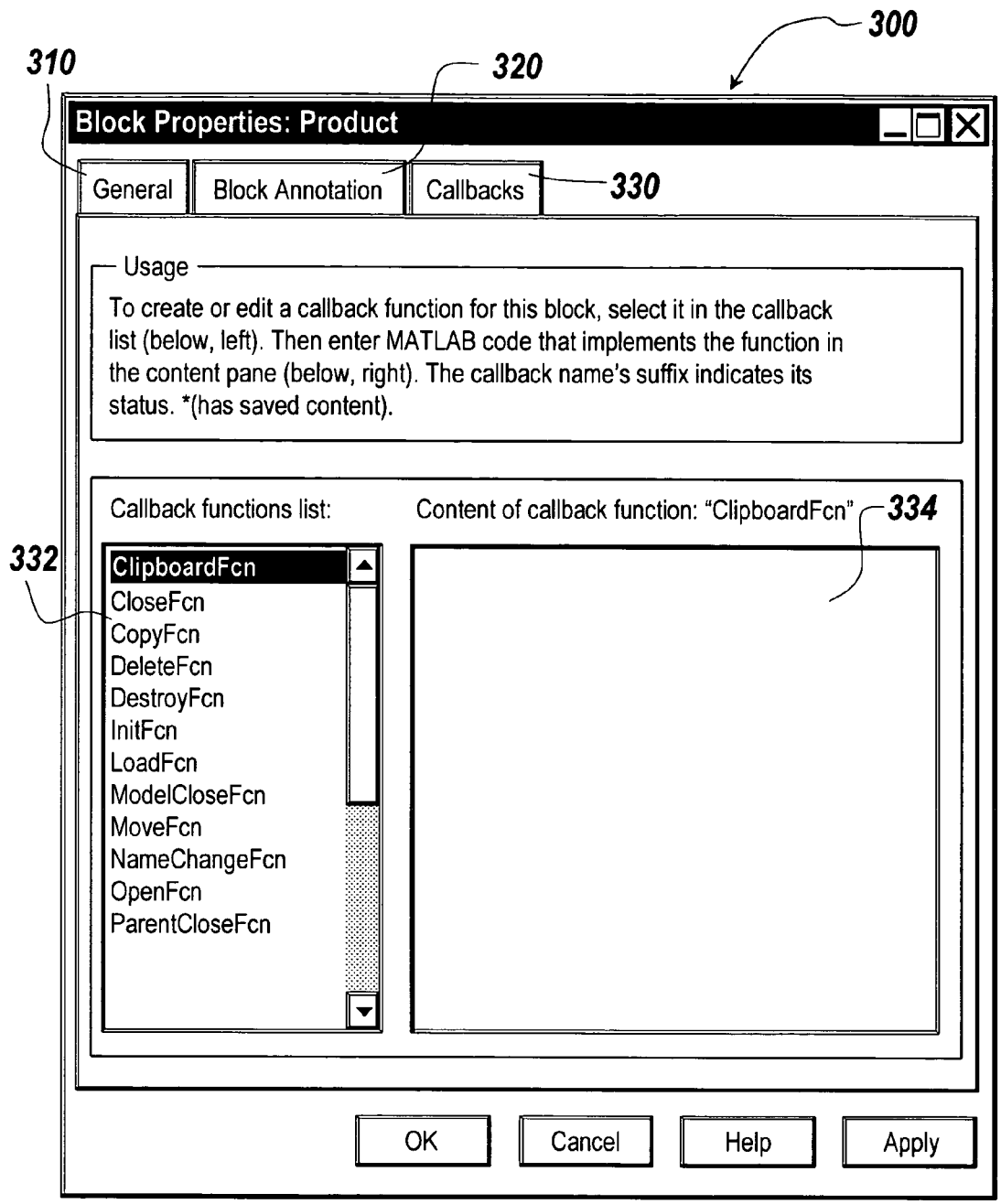

According to one embodiment, a graphical user interface, such as a dialog box, used to define, specify and edit properties of a block in a model, can include a code preview field for displaying aspects of code generated for the corresponding block. FIGS. 3A-3c shown an example of a block properties dialog box 300 for specifying properties and parameters of a selected block associated with the dialog box 300 and providing a code preview to the user to display code corresponding to selected properties and parameters of the selected block. One skilled in the art will recognize that the dialog box 300 of FIGS. 3A-3C is merely exemplary of one mechanism for defining, specifying, editing and/or customizing parameters and settings of an object component of a model, and that the invention is not limited to the illustrated configuration. Any suitable mechanism for allowing user to specify, edit and/or customize parameters and settings of a graphical object or component of a model, such as a block diagram may be used in accordance with the teachings of the invention.

The illustrative block properties dialog box 300 includes a number of panes including different fields for specifying different settings and properties of the block. For example, the illustrative block properties dialog box 300 includes a general pane 310 for specifying general properties of the block. The general pane 310 includes a "description" field 312, which comprises a text field for saving comments about the block, such as the block's purpose. The general pane 310 also includes a "priority" field 314 for specifying the block's sequencing during execution relative to other blocks in the same model. The general pane 310 also displays a "tag" field 306, which is illustrated as a general test field for specifying a block-specific label for a block.

In the illustrative embodiment of the invention, the general pane 310 of the block properties dialog box 300 further includes a "code preview" field 318, which provides a code preview to a user for the associated block, as defined by the dialog box 300. The code preview field 318 displays the aspect of code generated for the particular settings entered by the user. The code preview field 318 allows the user to review the code corresponding to the block and the impact of the chosen settings before the execution engine translates the entire model into code.

In one embodiment, the dialog box 300 provides a real-time code update in the code preview field 318 in response to changes to the component and object settings made by the user. When a user changes, edits or updates a setting, the code that will be generated corresponding to the setting also changes. The code preview field 318 may thus provide instantaneous feedback to the user regarding the impact or effect of the chosen setting or settings in the code. The code preview also provides feedback to the user as to how different settings change the generated code. The code preview displayed in the code preview field 318 may be used to inspect the consequence of settings for the block before they are applied, permitting cancellation of the changes to settings if the preview indicates the changes are ill-advised. According to the illustrative embodiment, the code preview field 318 can provide instantaneous feedback regardless of the size of the model.

The illustrative embodiment of the invention allows a user to generate code for a partially specified model. In one embodiment, the code preview field 318 presents only a subset of the code corresponding to the selected portion of the model. For example, the diagramming application can calculate and display the only subset of code that corresponds to or changes in response to a setting or settings of current interest.

The preview may employ tokens or pseudo-code for conciseness and generic use. For example, the code provided in the code preview may comprise a symbolic, non-literal representation of the actual code. The use of token code allows the user to eliminate comments or other superfluous aspects from the code preview.

The illustrative block properties dialog box 300 further includes a block annotation pane 320, illustrated in FIG. 3B, which allows a user to display the values of selected parameters of a block in an annotation that appears below or in the vicinity of the block's icon in the model. In the block annotation pane 320, a block property tokens field 322 displays a block property tag list, which lists all the tags that are valid for the associated block. To include one of the listed tags in the annotation, the user selects the tag, then clicks the button 324. The annotation field 326 displays the text of the annotation, which can include block property tokens. One skilled in the art will recognize that the code preview field 318 may also or alternatively be included in the block annotation pane 320.

A callbacks pane 330 in the illustrated block properties dialog box 300, shown in FIG. 3c allows a user to specify implementations for a block's callbacks. To specify an implementation for a callback, the user selects a callback function from a list in "call back functions list" field 332. The user then enters MATLAB commands that implement the callback in the "content" field 334. One skilled in the art will recognize that the code preview field 318 may also or alternatively be included in the block annotation pane 320.

Figure 4:
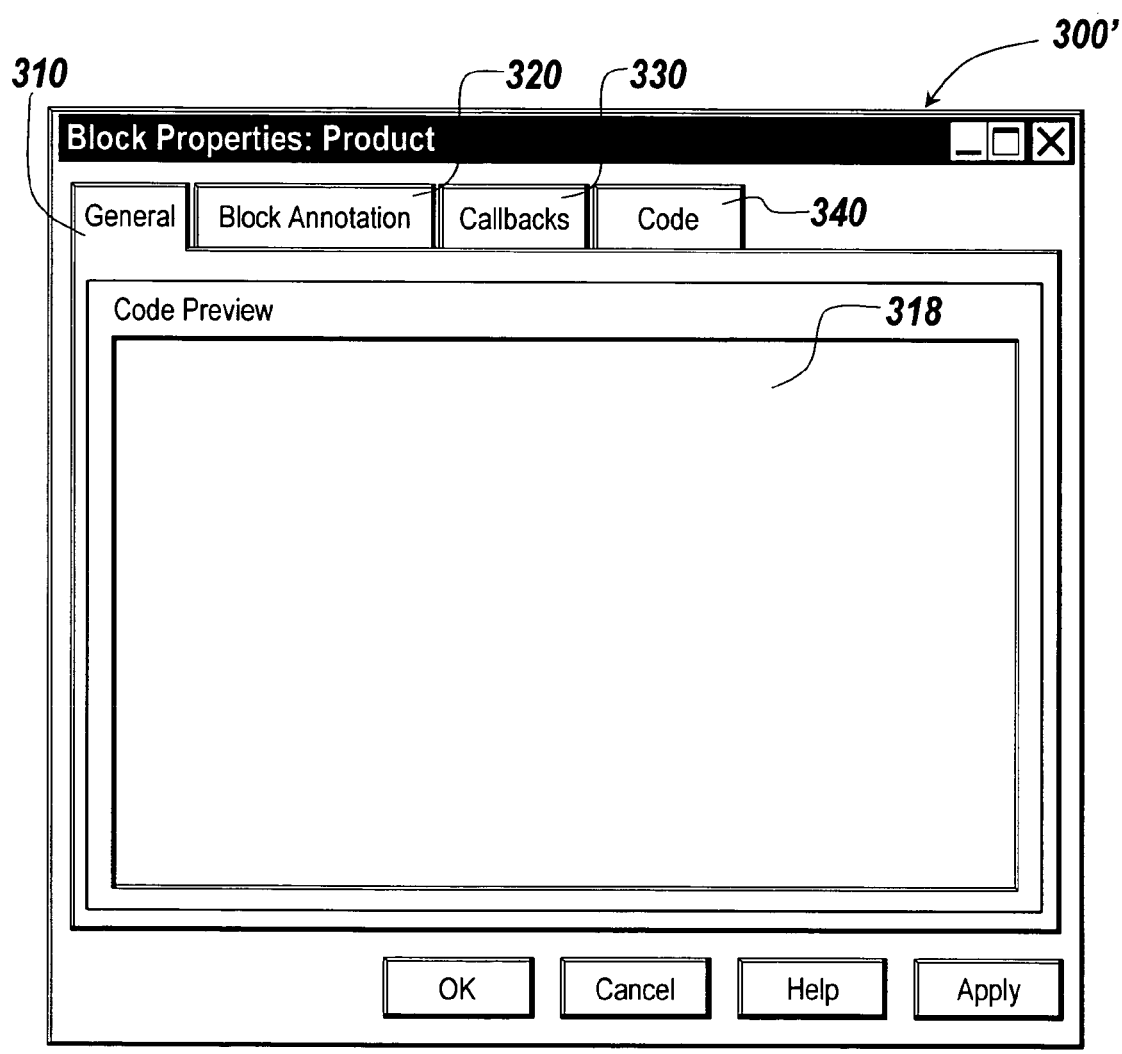
FIG. 4 illustrates a graphical user interface for defining properties of a block in a block diagram, including a pane for displaying a code preview corresponding to the properties, according to an illustrative embodiment of the invention

In an alternate embodiment of the invention, a block properties dialog box 300' may include a separate code preview pane 340 including a code preview field 318 for providing the code preview, as shown in FIG. 4.

The illustrated block properties dialog boxes 300 and 300' are exemplary of suitable interfaces for allowing a user to specify, define or edit properties of an object or component, such as a block, in a model, such as a block diagram. Any suitable interface used to specify, define or edit properties of a selected object or component in a model created within a graphical modeling environment may include a code preview field for displaying aspects of code corresponding to the selected object or component of the model, in accordance with the teachings of the invention.

Figure 5:
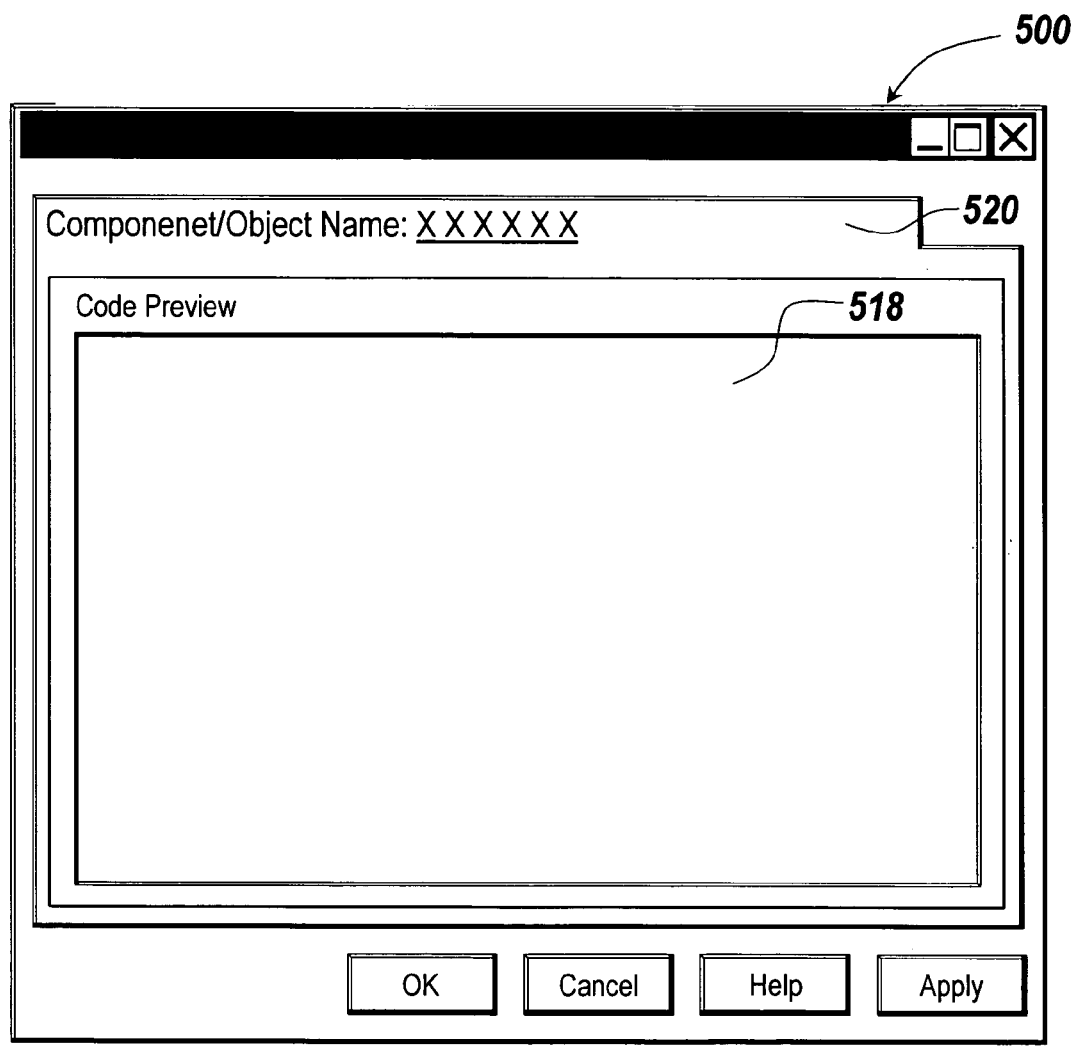
FIG. 5 illustrates a dedicated code preview interface for a selected object or component of a model, which presents a code preview to a user when the user selects the object or component according to an embodiment of the invention.

One skilled in the art will recognize that an entirely different interface may be provided for displaying a code preview, which is separate from the interface used to enter the settings for the corresponding object or component of the block diagram. For example, as shown in FIG. 5, the diagramming application may present a dedicated code preview interface 500 for a selected object or component of a model when the user selects the object or component. The name of the selected object or component is identified in field 520. The code preview interface 500 includes a code preview field 518 displaying a preview of the code generated for the selected component or object. In the illustrative embodiment, the code preview interface has the sole function of providing a code preview, though one skilled in the art will recognize that the code preview interface 500 may be used for other applications as well.

Figure 6:
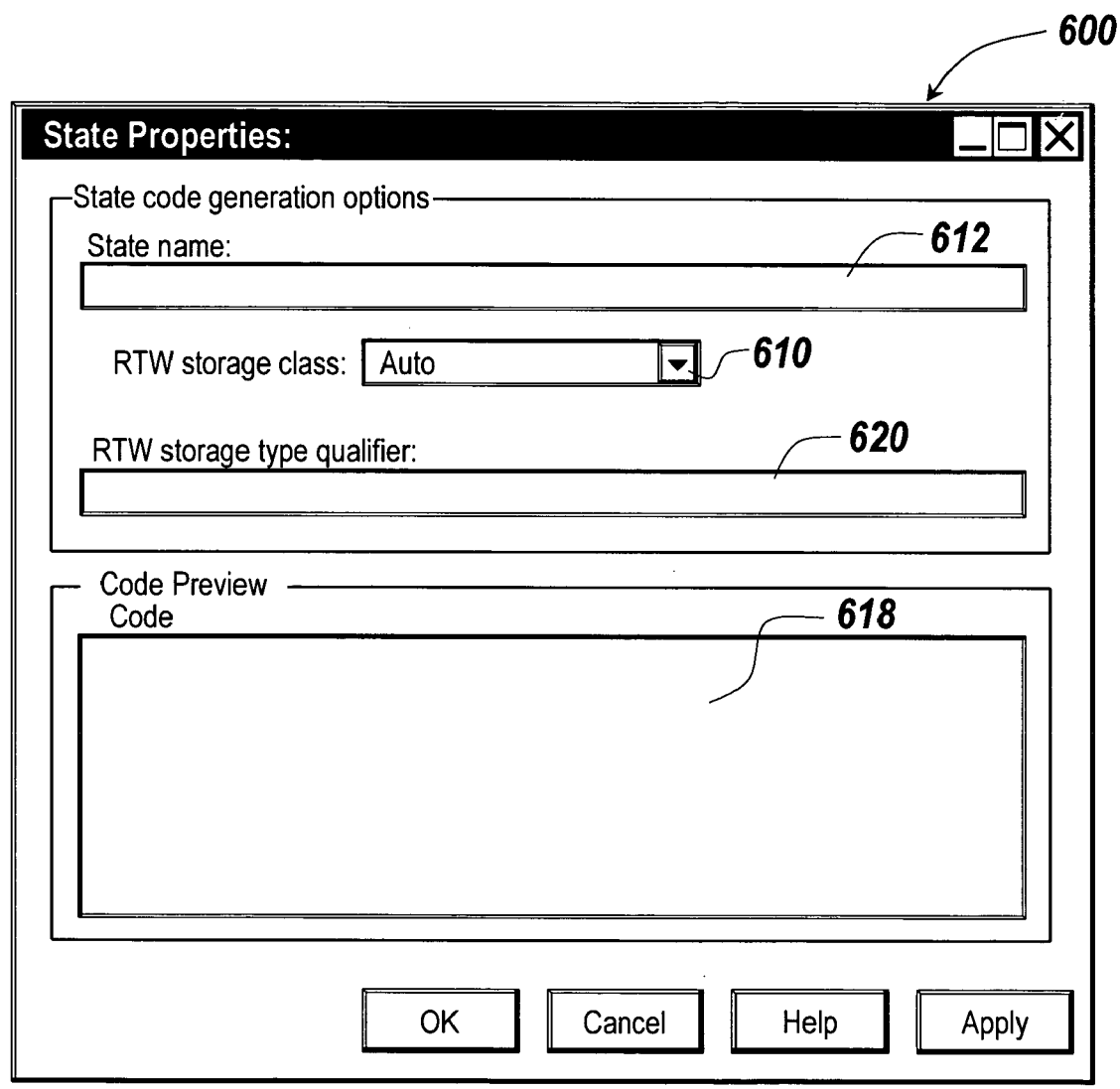
FIG. 6 illustrates an embodiment of a state properties dialog box, which allows a user to control how block states in a model are stored and represented in the generated code and presents a code preview representing code generated for the properties selected using the state properties dialog box.

The diagramming application 6 of the illustrative embodiment of the invention may also provide a state properties dialog box 600, shown in FIG. 6, which allows a user to control how block states in a model are stored and represented in the generated code by specifying code generation options for certain blocks with discrete states. The illustrative state properties dialog box 600 allows a user to interface a block's state to external code by assigning a storage class other than Auto to the state. Examples of the storage classes that can be assigned include, but are not limited to ExportedGlobal, ImportedExtern, or ImportedExternPointer.

The illustrative state properties dialog box 600 illustrates the default settings. For example, the RTW storage class menu 610 is set to "Auto". The Auto storage class is generally used for states that do not need to interface to external code. States with Auto storage class are stored as members of the Dwork vector. A state name may be entered in field 612.

Block states with storage classes other than Auto are stored in unstructured global variables, independent of the Dwork vector. These storage classes are used for states that interface to external code. The user changes the storage class by selecting a desired storage class (ExportedGlobal, ImportedExtern, or ImportedExternPointer) from the RTW storage class menu 610. In the ExportedGlobal storage class, the state is stored in a global variable. For the ImportedExtern storage class, the state is stored as an external variable. The ImportedExternPointer storage class sets the state as an extern pointer. For storage classes other than Auto, a user can enter a storage type qualifier, such as const or volatile, in a RTW storage type qualifier field 620.

In the exemplary embodiment, the state properties dialog box 600 also includes a code preview field 618 for allowing a user to preview code that reflects the impact of the settings chosen using the state properties dialog box 600.

As shown the state properties dialog box 600 allows a user to control whether or not states declared in generated code are interfaceable (visible) to externally written code. The user can also specify that states are to be stored in locations declared by externally written code and assign symbolic names to block states in generated code using the state properties dialog box 600. In addition, the code preview field 618 may automatically update the preview to instantaneously change the code when a user alters a setting in the dialog box 600. The code preview field 618 thus provides real-time feedback to the user when changes are made to the settings in the state properties dialog box 600.

Figure 7:
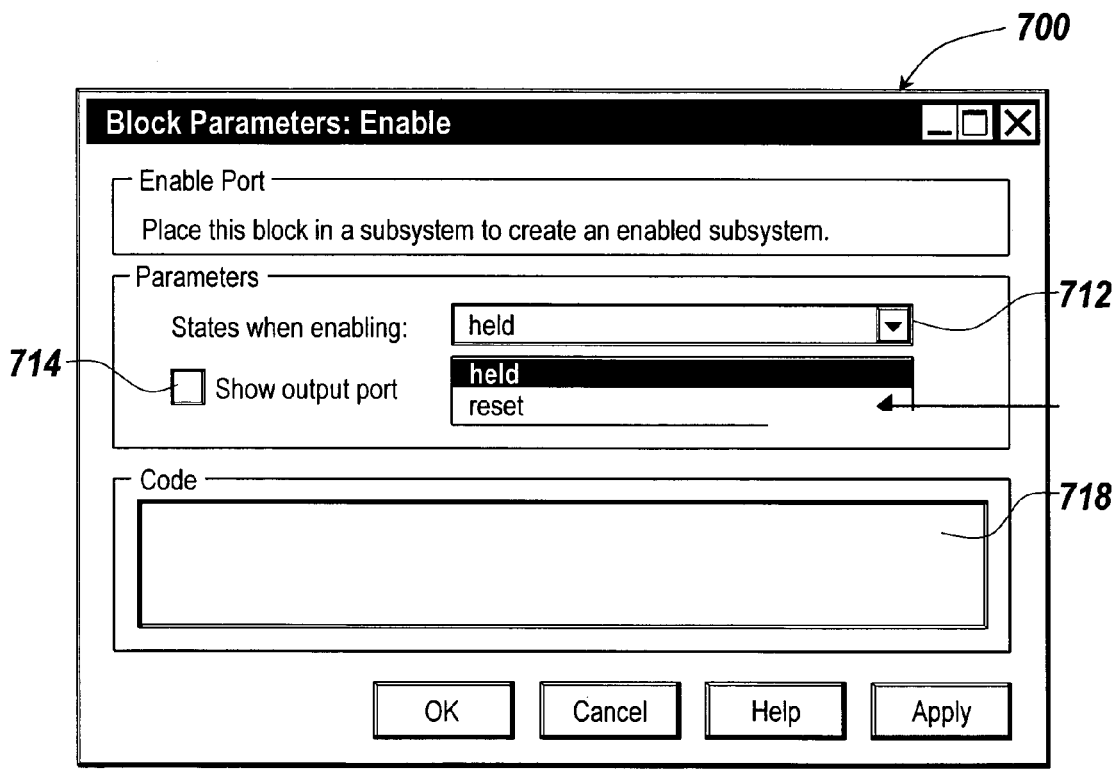
FIG. 7 illustrates an example of a graphical user interface for defining certain settings for an enabled subsystem and providing a code preview relating to the settings, according to one embodiment of the invention.

In another embodiment, a graphical user interface used to define, specify and edit properties of a block comprising a subsystem may include a code preview field to display a code preview corresponding to the subsystem block. One example of a graphical user interface 700 for defining certain settings for an enabled subsystem and providing a code preview relating to the settings is shown in FIG. 7. An enabled subsystem is a subsystem that executes at each simulation step where the control signal has a positive value. The illustrative interface 700 allows a user to select the states when a corresponding subsystem becomes enabled. In a states field 712, the user can select whether to hold the subsystem states at their previous, most recent values, by selecting a first option "held" from a list. Alternatively, the user can select a "reset" option in the states field 712 to specify that the states revert to their initial conditions when the enabled subsystem executes. The illustrative interface 700 also includes an option for showing an output port of the enabled subsystem in field 714.

The illustrative interface further includes a code preview field 718 for displaying the implementation, i.e., the code generated, of the settings associated with the enabled subsystem, as entered in fields 712 and 714. The code preview field 718 allows the user to preview the impact of the settings chosen by inspecting the code presented in the preview field 718. In an illustrative embodiment, the diagramming application automatically updates the code preview field 718 in response to a user changing one or more of the settings for the enabled subsystem corresponding to the interface 700.

One skilled in the art will recognize that the interface 700 is exemplary of one type of interface for selecting settings of a subsystem and viewing the impact of the settings in code, and that any suitable interface may be used to present a code preview to a user of aspects of the code generated in response to settings chosen by the user, in accordance with the teachings of the invention.

According to another aspect, a code preview field in an interface for a block comprising a subsystem, such as the interface used to specify a function signature for the subsystem, allows a user to preview the literal function signature that will be generated in response to a parameter utilizing a regular expression. The regular expression allows a user to specify the signature as broadly or as narrowly as desired. The code preview presented in the code preview field allows the user to modify the implementation of the model as appropriate.

Figure 8:
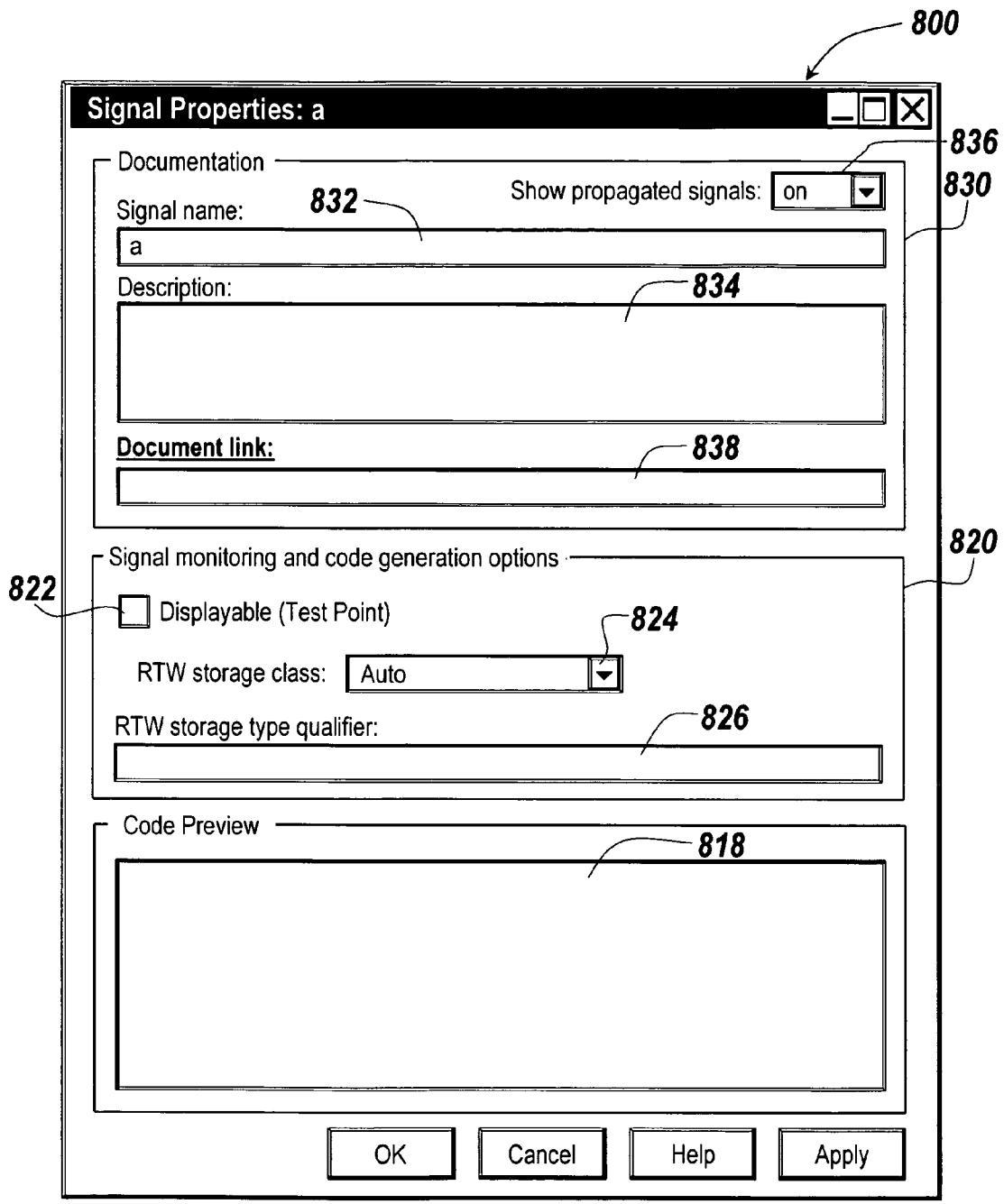
FIG. 8 illustrates an example of signal properties dialog box for viewing or editing the parameters of a signal in a block diagram and providing a code preview relating to the settings, according to one embodiment of the invention.

A signal properties dialog box 800, shown in FIG. 8, may be used to view or edit the parameters of a signal in a block diagram. As shown, the signal properties dialog box 800 includes a documentation section 830 allowing a user to select properties relation to the documentation of the selected signal. The documentation section signal name field 832 for allowing a user to specify a name for the selected signal, and a description field 834 for allowing a user to enter a description of the selected signal. A "show propagated signals" field 836 allows a user to select whether to display signals represented by a virtual signal in the selected signal's label. A document link field 838 allows a user to enter a MATLAB expression that displays documentation for the selected signal.

The illustrative signal properties dialog box 800 further includes a signal monitoring and code generation options section 820, which allows a user to specify properties relating to signal monitoring and code generation. In a displayable field 822, a user can select whether to indicate that the selected signal can be displayed during simulation. In the RTW storage class field 824, the user can select the storage class for the selected signal from a list. In a RTW storage type qualifier field 826, the user can select the storage type for the selected signal from a list.

In addition, the illustrative signal properties dialog box 800 further includes a code preview field 818, which may be located in any suitable location and have any suitable configuration, for displaying a preview of aspects of the code generated for the signal in response to the settings entered in the signal properties dialog box 800.

One skilled in the art will recognize that the code preview for a signal in a model, such as a block diagram, may alternatively be presented through a different interface than the signal properties dialog box 800. For example, a separate graphical user interface, which is displayed on the screen upon request by the user, can include a code preview field for displaying aspects of code for a selected signal in a model. The code preview field allows the user to review the code corresponding to the particular signal, and, if necessary, revise the signal properties in a different interface to change the code.

In yet another embodiment of the invention, a diagramming application enables a user to customize the way in which an execution engine creates code that references data of various classes. The user can customize storage classes in a virtually unlimited number of manners, to create different variations in the generated code.

Figure 9:
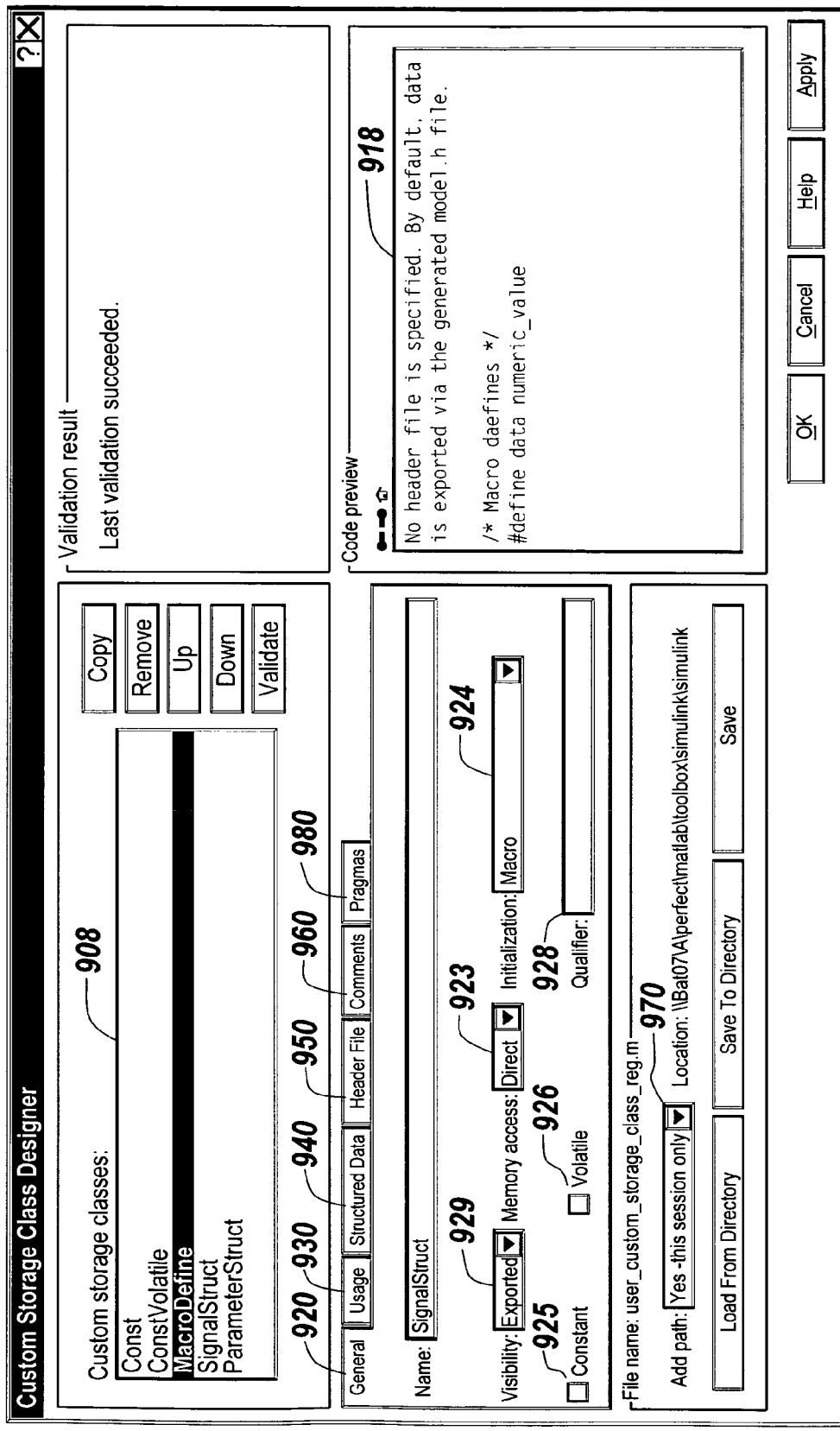
FIG. 9 illustrates a custom storage class designer for enabling a user to specify, edit and define custom storage classes for the data in a selected model, and display code representing the parameters selected by the user, according to one embodiment of the invention.
Figure 10:
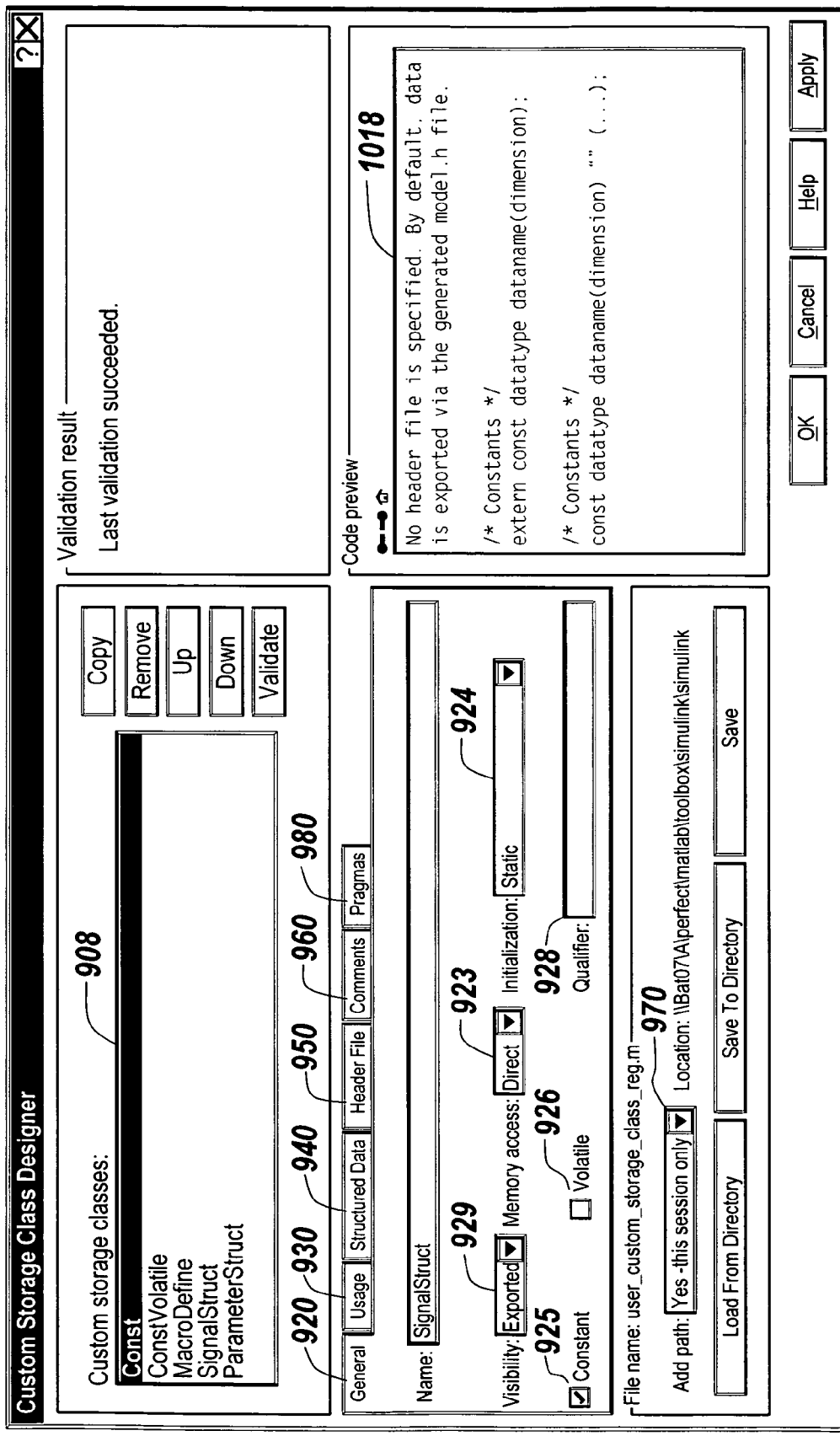
FIG. 10 illustrates a custom storage class designer for enabling a user to specify, edit and define custom storage classes for the data in a selected model, and display code representing the parameters selected by the user, according to another embodiment of the invention.

As shown in FIGS. 9 and 10, a custom storage class designer, illustrates as graphical user interfaces 900 and 900', respectively, allows a user to specify, edit and define custom storage classes for the data in a selected model. As shown, each interface 900 and 900' further includes a code preview field 918 and 1018, respectively, which illustrates the form of the code references for the combination of parameter settings chosen using the custom storage class designer for each storage class. In an illustrative embodiment, the preview field 918 and 1018 instantaneously generate the code preview in response to the settings chosen by the user, and provide real-time feedback to the designer of the selected class.

FIG. 9 illustrates a custom storage class designer, consisting of a graphical user interface 900, which is used to create and specify the properties of a custom storage class named "MacroDefine". The "MacroDefine storage class declares macros for instances of constant data. The characteristics of each storage class are specified via parameter settings accessible from the graphical interface. The custom storage class designed through the interface 9010 is defined by a unique permutation of parameter settings. The parameter settings correspond to frequently utilized features, and their combined application is typically sufficient to capture the desired characteristics of the custom storage class. As shown, the illustrative interface 900 includes a custom storage class field 908 allowing a user to select a custom storage class, illustrated as "MacroDefine" from a list of potential storage classes. The interface also includes a general pane 920 including a name field 922 for specifying a name of a storage class, ("SignalStruct"), a visibility field 929, a memory access field 923, an initialization field 924, a constant field 925, a volatile field 926 and a qualifier field 928. The interface 900 also includes a "usage" pane 930, a "structured data" pane 940, a "header file" pane 950, a "comments" pane 960 and a "pragmas" pane 980 for entering other parameters for the selected storage class. In addition, a file name path field 970 allows a user to add or customize a path for the selected storage class to a directory.

The interface also includes a code preview field 918, which provides a preview of the data declarations corresponding to the custom storage class being defined through the settings being chosen in the custom storage class editor 900.

In the illustrative embodiment, the code preview field 918 provides instantaneous feedback of the form of the code generated for the chosen parameter settings for the custom storage class.

FIG. 10 illustrates a custom storage class designer, consisting of a graphical user interface 900' similar to the graphical user interface 900 of FIG. 9. In FIGS. 9 and 10, like parts are designated with like numbers. The interface 900' is used to create and specify the properties of a custom storage class "Const", which declares variables using the "const" keyword for instances of constant data. As shown, the custom storage class "Const" is selected in field 908. The code preview field 1018 provides a preview of the data declarations corresponding to the "Const" storage class as defined through the settings chosen by the user and entered in the interface 900'

Figure 11A:
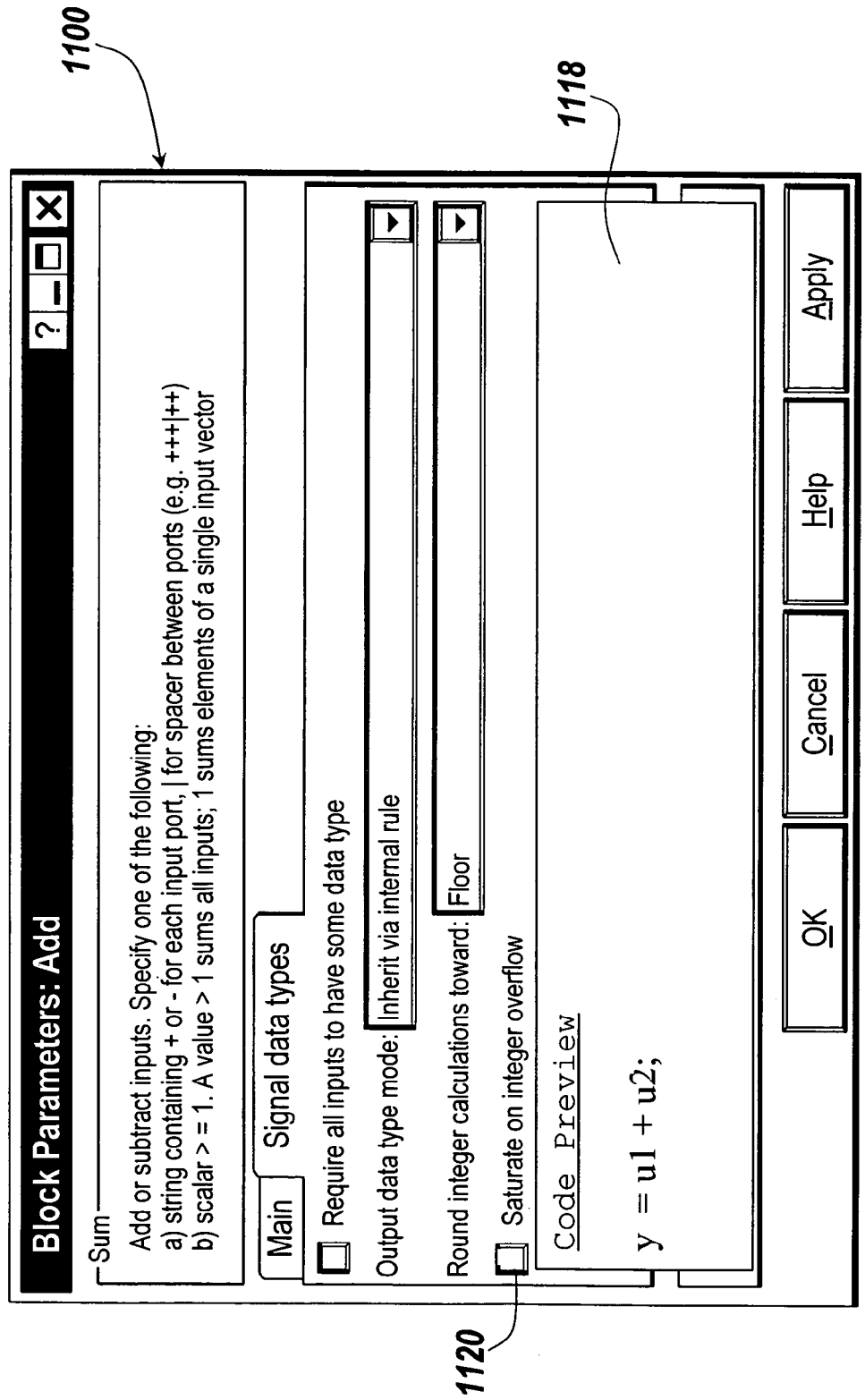
FIGS. 11A-11C illustrate a block dialog box including a checkbox for specifying code to be displayed in a code preview field.
Figure 11B:
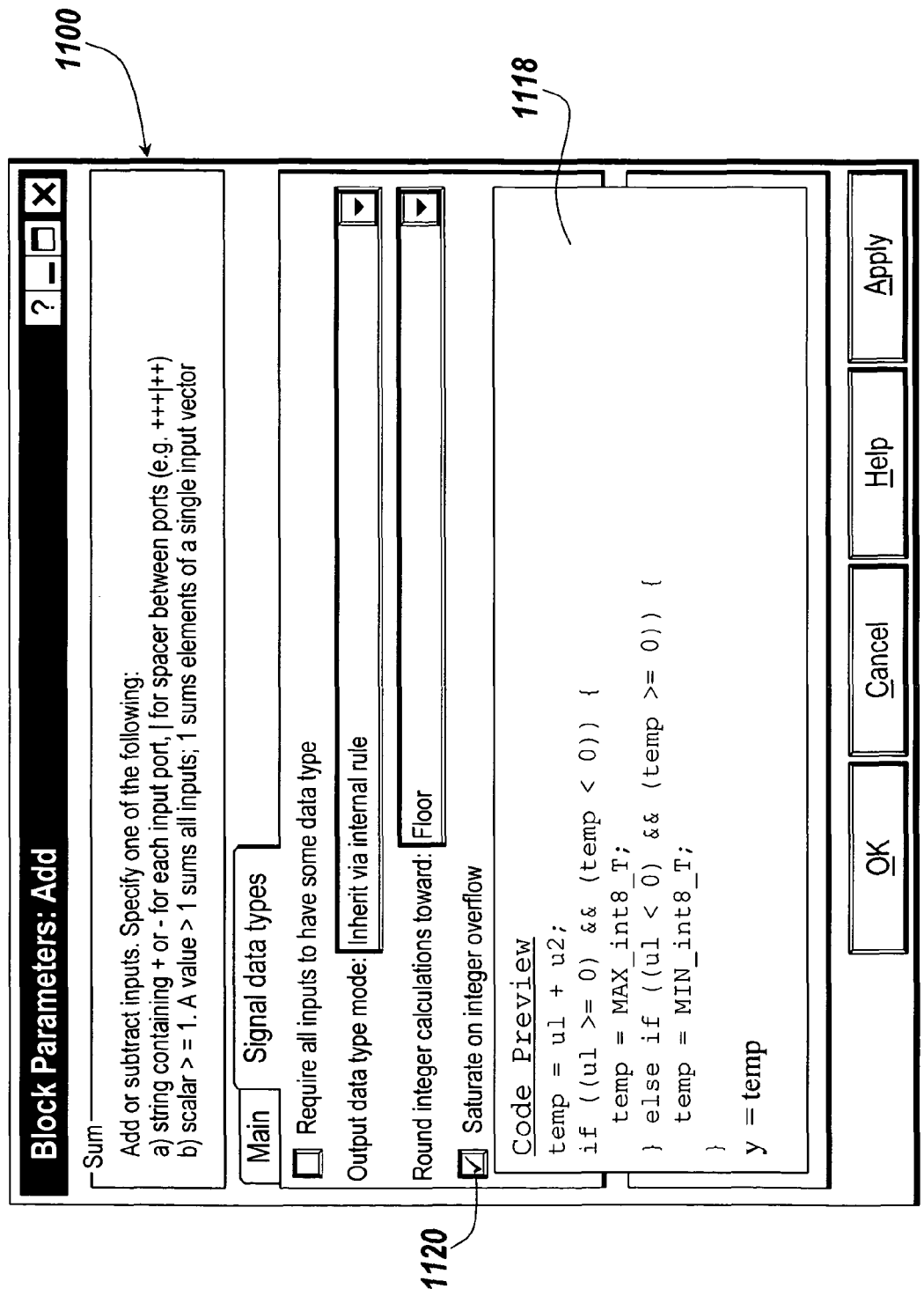
Figure 11C:
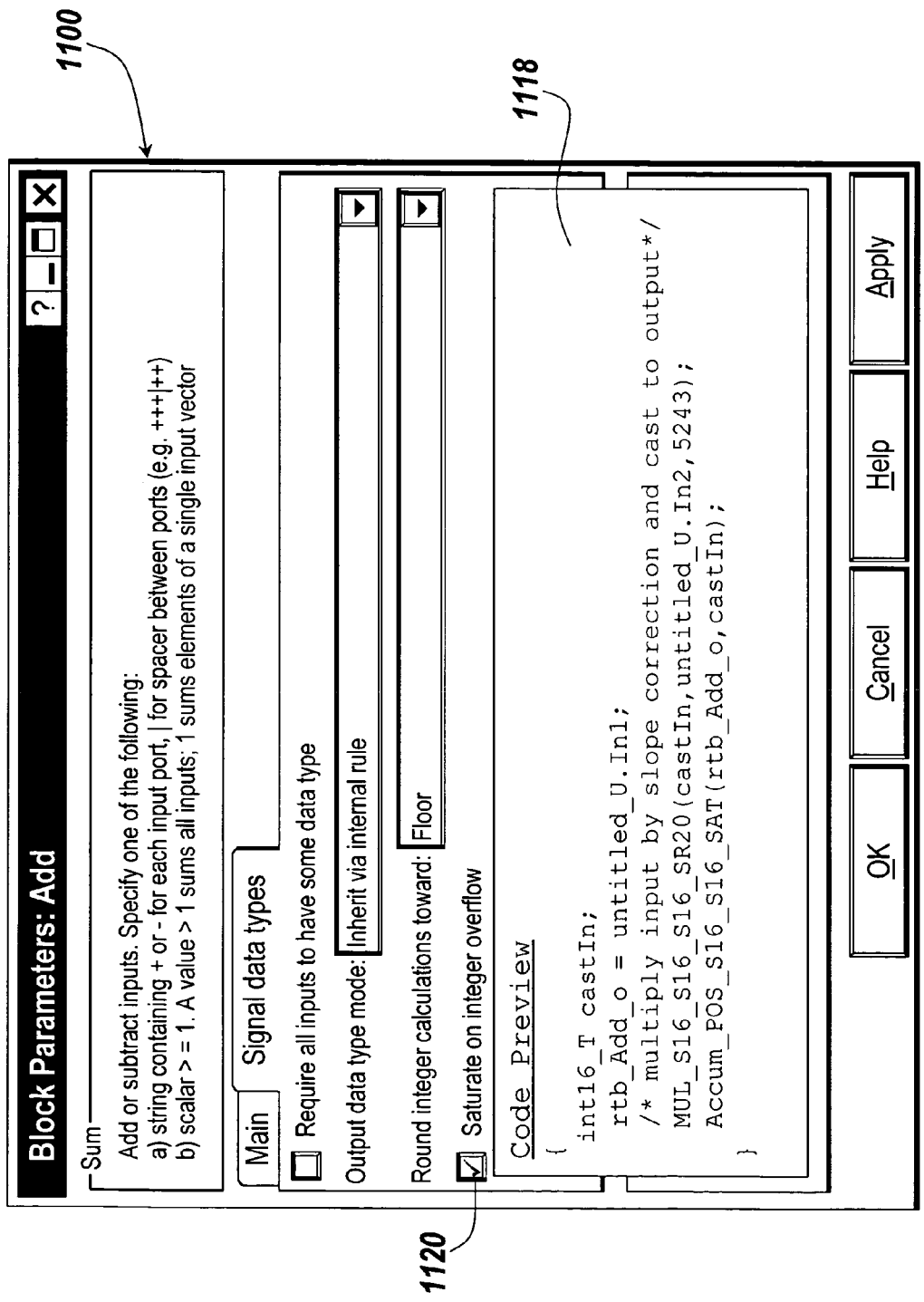

In yet another embodiment of the invention, a diagramming application enables a user to easily change the code preview. For example FIGS. 11A-11C, illustrate a dialog box 1100 for a sum (add) block, which is used to specify, define and edit properties of the sum block and includes a code preview field 1118 for displaying aspects of code generated for the sum block. The sum block, also known as an add block, adds two input signals and outputs the result. The sum block dialog box 1100 further includes a checkbox 1120, illustrated a "saturate on integer overflow" checkbox, for specifying the type of code to be generated in the code preview field 1118. When the "saturate on integer overflow" checkbox 1120 is checked, additional code is generated if the inputs to the block are of an integer, as opposed to floating-point, type. One skilled in the art will recognize that any suitable means for changing the code preview may be used.

FIG. 11A illustrates the code preview field 1118 for the illustrative sum block with the "Saturate on integer overflow" box 1120 unchecked. As shown, the displayed code is simply:

y=u1+u2;

FIG. 11B illustrates the code preview field 1118 displayed in the illustrative dialog box 1110 when the user checks the "Saturate on integer overflow" 1120 box. As shown, the displayed code is:

temp=u1+u2;
if  ((u1>=0)  &&  (u2>=0)  &&  (temp<0))
  {temp=MAX_int8_T;
} else if ((u1<&& (u2<0) && (temp>=0))
  {temp=MIN_int8_T;
}
y=temp;

If u1 and u2 are fixed-point types, functions or macros are used to perform much of the work. In this case, the code preview field 1118 would display different code, as shown in FIG. 11C. In FIG. 11C the code previewed is:

{ int16_T castIn;

rtb_Add_o=untitled_U.In1;

/* multiply input by slope correction and cast to output */MUL_S16_S16_S16_SR20(castIn, untitled_U.In2, 5243);

ACCUM_POS_S16_S16_SAT(rtb_Add_o, castIn);

}

Figure 12:
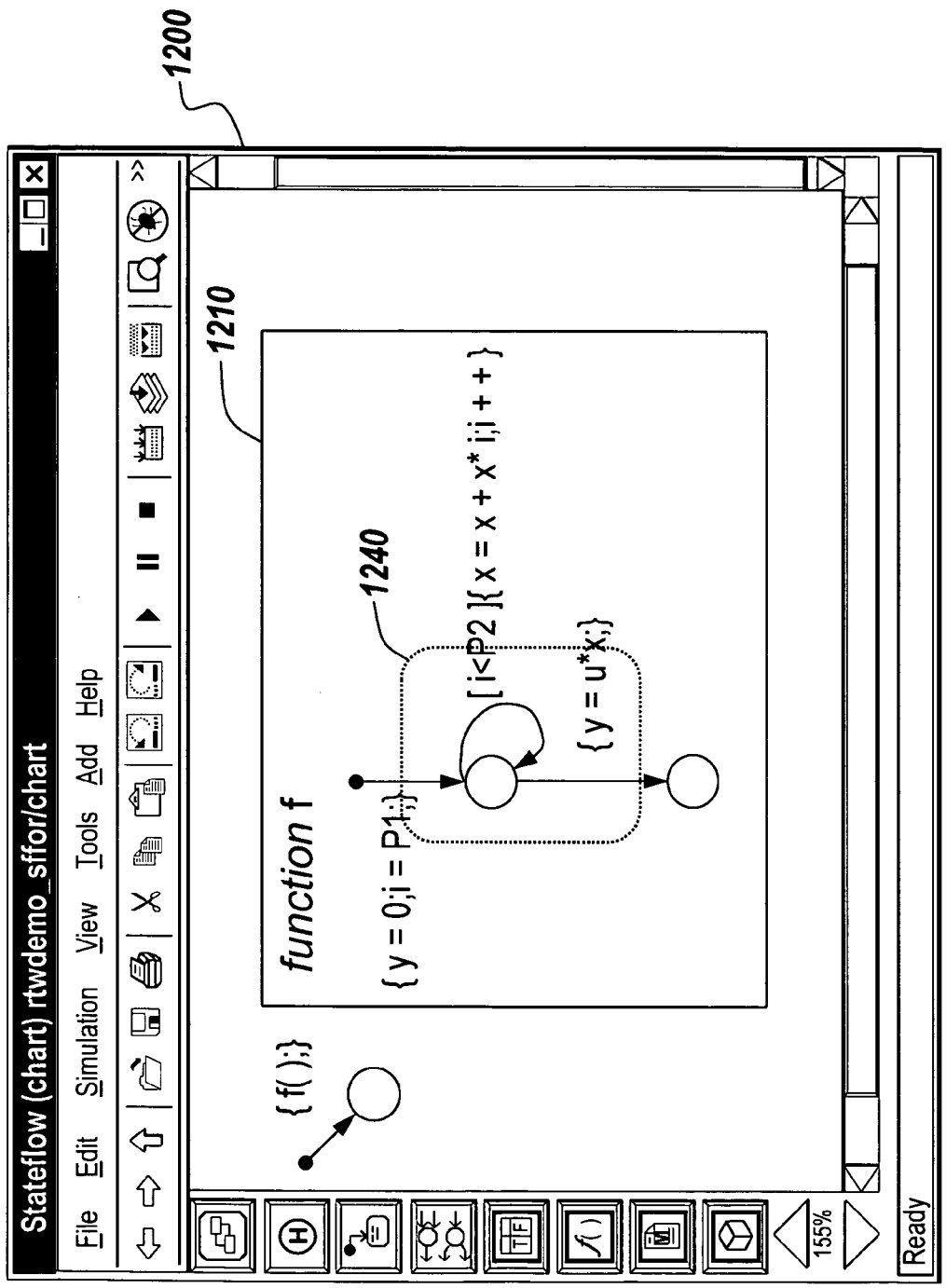
FIG. 12 illustrates a graphical user interface displaying a block diagram for which a user can request a code preview according to an illustrative embodiment of the invention.

According to another embodiment of the invention, a user can request a code preview by selecting apportion of a graphical model. For example, FIG. 12 illustrates a graphical user 1200 interface displaying a block diagram representing a function f, for which a user can request a code preview according to an illustrative embodiment of the invention. In FIG. 12, the function f is represented by a STATEFLOW chart 1210, which specifies a for-loop, though one skilled in the art will recognize that any suitable graphical modeling environment may be used. A STATEFLOW chart is a graphical representation of a finite state machine where states and transitions form the basic building blocks of the system. A STATEFLOW chart may be represented within a block diagram model as a block, as shown in FIG. 12. STATEFLOW is available from The MathWorks, Inc., of Natick, Mass.

In an embodiment of the invention, a user can select a portion of a graphical model to request a code preview. For example, in FIG. 12, the user can place a shaded, rounded, semi-transparent square 1240 over the loop, to request a code preview of the net collection of all transitions that intersect it.

The code preview for the illustrated function would display the following code for a "for loop" in a code preview field:

y=0;
for (i=P1; i<P2; i++) {x+=x*i;
}
y=u*x;

The code preview may be displayed in dedicated code preview interface, such as the interface 500 shown in FIG. 5, or in another suitable field.

The use of a graphical user interface to display a code preview corresponding to user-selected settings of a component or object in a block diagram allows a user to inspect the consequences of the settings before the settings are applied, and cancel the settings if necessary. In this manner, user can display and review aspects of code generated for a particular setting or settings, without having to go through the whole code generation process for the complete model.

As described above, a code preview may be presented through the same general interface through which the settings are chosen, and/or the code preview may be presented in through a different interface.

The code preview may be update in real-time in response to changes to the component and object settings, to provide instantaneous feedback to the user of the impact of the chosen settings. Thus, code preview of the illustrative embodiments of the invention provides a form of interactive documentation, where the user is able to receive instantaneous feedback and information about the usage of the tool.

In addition, the code preview enables a user to determine the impact or effect of certain settings by examining the how changing the settings affects the generated code. In this manner, the code preview provides hands-on learning to a user, without requiring use of a help menu or other tutorial.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. In a graphical modeling environment, a method comprising:
   receiving a user request to define a parameter or a setting of a block in a simulatable block diagram model via a first graphical user interface;
   determining how defining the parameter or the setting of the block in the simulatable block diagram model according to the user request will alter code corresponding to the block, without generating entire code for the simulatable block diagram model, the entire code for the simulatable block diagram model being executable to simulate the simulatable block diagram model;
   automatically generating in real-time based on the determining, using a predictor mechanism, a preview of code representative of the code corresponding to the block prior to generating, using an execution engine, the entire code for the simulatable block diagram model, wherein:
   the preview of the code predicts and emulates the code corresponding to the block as if generated by the execution engine, the preview of the code and the code corresponding to the block are in a different coding format; and
   automatically displaying in real-time the preview of the code on a preview graphical user interface wherein the user can refine the preview of the code by altering the parameter or the setting for the block on the preview graphical user interface.

2. The method of claim 1, wherein the preview of the code comprises a subset of corresponding code for the block.

3. The method of claim 2, wherein the subset of code corresponds to the parameter or the setting.

4. The method of claim 1, wherein generating the preview of the code comprises:
   generating an estimation of the code corresponding to the block using the predictor mechanism.

5. The method of claim 1, wherein the preview of the code comprises a symbolic, non-literal representation of code corresponding to the block.

6. The method of claim 1, wherein the preview of the code comprises pseudo-code.

7. The method of claim 1, further comprising:
generating code representing the altered parameter or the altered setting; and
displaying the code representing the altered parameter or the altered setting on the preview graphical user interface.

8. The method of claim 1, further comprising altering a second parameter or a second setting in the block diagram model after the displaying of the preview of the code.

9. The method of claim 7, further comprising:
generating code representing the altered second parameter or the altered second setting; and
displaying the code representing the altered second parameter or the altered second setting on the preview graphical user interface.

10. The method of claim 1, further comprising:
receiving the parameter or the setting via a dialog box associated with the block.

11. The method of claim 10, wherein the dialog box includes a code preview field for displaying the preview of the code.

12. In a graphical modeling environment, a method comprising:
determining how defining a parameter or a setting of a block in a simulatable block diagram model via a first graphical user interface according to a user request will alter code corresponding to the block, without an execution engine generating entire code for the simulatable block diagram model, the entire code for the simulatable block diagram model being executable to simulate the simulatable block diagram model;
based on the determining, automatically updating a preview of code representative of the code corresponding to the block in the simulatable block diagram model in response to a user altering the parameter or the setting of the block, wherein the preview of code and the code corresponding to the block are in a different coding format, the updating comprising:
automatically generating in real-time based on the determining, the preview of code using a predictor mechanism, prior to generating, using the execution engine, the code entire block diagram model, the preview of code predicting and emulating the code corresponding to the block as if generated by the execution engine; and
automatically displaying in real-time the updated preview of the code on a preview graphical user interface wherein the user can refine the preview of the code by altering the parameter or the setting for the block on the preview graphical user interface.

13. The method of claim 12, further comprising:
receiving a cancellation of the altering of the setting after displaying the updated preview of the code.

14. A computer-readable storage medium for use with an electronic device having a processor, the medium storing instructions executable by the processor of the electronic device, the medium storing:
one or more instructions for receiving a user request to define a parameter or a setting of a block in a simulatable block diagram model via a first graphical user interface;
one or more instructions for determining how defining the parameter or the setting of the block in the simulatable block diagram model according to the user request will alter code corresponding to the block, without generating entire code for the simulatable block diagram model, the entire code for the simulatable block diagram model being executable to simulate the simulatable block diagram model;
one or more instructions for automatically generating in real-time, using a predictor mechanism, based on the determining, a preview of code representative of the code corresponding to the block in the simulatable block diagram model in response to the user request, the generating the preview of the code occurring prior to generating the entire code for the simulatable block diagram model using an execution engine, the preview of the code predicting and emulating the code corresponding to the block as if generated by the execution engine, where the preview of the code is presented in a coding format that differs from a coding format of the code corresponding to the block; and
one or more instructions for automatically displaying in real-time the preview of the code on a preview graphical user interface wherein the user can refine the preview of the code by altering the parameter or the setting for the block on the preview graphical user interface.

15. A computer-readable storage medium for use with an electronic device having a processor, the medium storing instructions executable by the processor of the electronic device, the medium storing:
one or more instructions for determining how defining a parameter or a setting of a block in a simulatable block diagram model via a first graphical user interface according to a user request will alter code corresponding to the block, without an execution engine generating entire code for the simulatable block diagram model, the entire code for the simulatable block diagram model being executable to simulate the simulatable block diagram model;
one or more instructions for automatically updating, based on the determining, a preview of code representative of the code corresponding to the block in the simulatable block diagram model in response to a user altering the parameter or the setting of the block, wherein the preview of code and the code corresponding to the block are in a different coding format, the one or more instructions for updating comprising:
one or more instructions for automatically generating in real-time based on the determining, the preview of code using a predictor mechanism, the preview of the code prior to generating, using the execution engine, the entire code for the simulatable block diagram model, the preview of code predicting and emulating the code corresponding to the block as if generated by the execution engine; and
one or more instructions for automatically displaying in real-time the updated code preview of the code on a preview graphical user interface wherein the user can refine the code preview by altering the parameter or the setting for the block on the preview graphical user interface.

16. A system for generating and displaying a graphical programming application, comprising:
user-operable input means for inputting data to the graphical programming application;
a display device for displaying a simulatable block diagram model via a first graphical user interface; and an electronic device including memory for storing computer program instructions and data, and a processor for executing the stored computer program instructions, the computer program instructions including:

instructions for determining how defining a property of a block in the simulatable block diagram model according to a user request will alter code corresponding to the block, without generating entire code for the simulatable block diagram model, the entire code for the simulatable block diagram model being executable to simulate the simulatable block diagram model; and instructions for providing, based on the determining, a code preview to a user on the display device wherein the user can refine the code preview by altering the property of the block on the preview graphical user interface, wherein:

the code preview automatically displays in real-time a preview of code representative of the code corresponding to the block in the simulatable block diagram model after the user defines the property of the block using the user-operable input means, the preview of code and the code corresponding to the block are in a different coding format, the preview of the code is automatically created in real-time based on the determining by a predictor mechanism which emulates how the code corresponding to the block appears when the code corresponding to the block is generated by an execution engine, and the preview of the code is created prior to generating, using the execution engine, the entire code for the simulatable block diagram model.

17. The system of claim 16, wherein the preview graphical user interface includes a field for displaying the code preview.

18. A system for generating and displaying a graphical programming application, comprising:

user-operable input means for inputting data to the graphical programming application;

a display device for displaying a simulatable block diagram model on a first graphical user interface; and an electronic device including memory for storing computer program instructions and data, and a processor for executing the stored computer program instructions, the computer program instructions including instructions for:

receiving a first datum altering a setting of a first portion of the simulatable block diagram model;

determining how altering the setting of the first portion of the simulatable block diagram model will alter code corresponding to the first portion in the simulatable block diagram model, without an execution engine generating entire code for the simulatable block diagram model, the entire code for the simulatable block diagram model being executable to simulate the simulatable block diagram model;

in response to the first datum, automatically generating in real-time, based on the determining, a preview of code representative of the code corresponding to the first portion of the simulatable block diagram model using a predictor mechanism, wherein the preview of the code and the code corresponding to the first portion are in a different coding format, the preview of the code predicting and emulating the code corresponding to the first portion as if generated by the execution engine prior to generation of the entire code for the simulatable block diagram model by the execution engine; and automatically displaying in real-time the preview of the code on a preview graphical user interface wherein the user can refine the preview of the code by altering the setting for the first portion on the preview graphical user interface.

19. The system of claim 18, wherein the preview graphical user interface includes a field for displaying the preview of the code.

* * * * *

UNITED STATES PATENT AND TRADEMARK OFFICE
CERTIFICATE OF CORRECTION

| | | |
|---|---|---|
| PATENT NO. | : 7,849,440 B1 | |
| APPLICATION NO. | : 10/826599 | |
| DATED | : December 7, 2010 | |
| INVENTOR(S) | : Matthew Englehart | |

It is certified that error appears in the above-identified patent and that said Letters Patent is hereby corrected as shown below:

At column 3, line 62, please insert -- . -- after invention.

At column 8, line 15, please insert -- . -- after process.

At column 14, line 25, please change "("SignaiStruct")" to -- ("SignalStruct") --.

Signed and Sealed this
Thirty-first Day of May, 2011

David J. Kappos
*Director of the United States Patent and Trademark Office*